(12) United States Patent
Peterson et al.

(10) Patent No.: US 10,304,346 B2
(45) Date of Patent: May 28, 2019

(54) SYSTEM AND METHOD FOR TRAINING WITH A VIRTUAL APPARATUS

(75) Inventors: Matthew R. Peterson, Newport Beach, CA (US); Mark Bodner, Placentia, CA (US)

(73) Assignee: MIND Research Institute, Irvine, CA (US)

(*) Notice: Subject to any disclaimer, the term of this patent is extended or adjusted under 35 U.S.C. 154(b) by 339 days.

(21) Appl. No.: 12/494,154

(22) Filed: Jun. 29, 2009

(65) Prior Publication Data
US 2009/0325137 A1 Dec. 31, 2009

Related U.S. Application Data

(63) Continuation of application No. 11/218,282, filed on Sep. 1, 2005, now abandoned.

(51) Int. Cl.
  *G09B 5/00* (2006.01)
  *G09B 5/02* (2006.01)
  *G09B 7/00* (2006.01)

(52) U.S. Cl.
  CPC ............. *G09B 5/00* (2013.01); *G09B 5/02* (2013.01); *G09B 7/00* (2013.01)

(58) Field of Classification Search
  CPC .... G09B 7/00; G09B 7/02; G09B 5/00; A61B 5/16
  (Continued)

(56) References Cited

U.S. PATENT DOCUMENTS

| | | | |
|---|---|---|---|
| 3,596,377 | A | 8/1971 | Abbey |
| 3,698,277 | A | 10/1972 | Barra |

(Continued)

FOREIGN PATENT DOCUMENTS

WO    WO2007/028142    3/2007

OTHER PUBLICATIONS

Kennedy, Brian. Tetris Plus—Jaleco. Review and description of Tetris Plus [online], [retrieved on May 29, 2013]. Retrieved from the Internet <URL: http://dextremes.com/sega/revs/tetrisplus.html>.*

(Continued)

*Primary Examiner* — Peter R Egloff
(74) *Attorney, Agent, or Firm* — Knobbe Martens Olson & Bear LLP

(57) ABSTRACT

A method and system of training in conjunction with a computer animation executed by a computing environment is described. The method includes recognizing a task to be performed in the computer animation, recognizing a problem, displayed in the computer animation, to accomplish the task, and solving the problem by manipulation of a virtual apparatus having virtual components displayed in the computer animation. The virtual components are manipulated by a student or user desiring to learn. The student is taught to understand logically consistent goals by using the virtual apparatus and without language interaction. Rules and properties for a subject area are modeled to the student by the virtual apparatus without language interaction. The student is taught to operate the virtual apparatus without language interaction. The student is requested to operate the virtual apparatus to reach goals in a sequence of problems having progressive difficulty and without language interaction.

42 Claims, 8 Drawing Sheets

(58) Field of Classification Search
USPC ......... 434/323, 350, 236, 362; 463/9, 11, 31
See application file for complete search history.

(56) References Cited

U.S. PATENT DOCUMENTS

| | | | |
|---|---|---|---|
| 4,402,249 A | 9/1983 | Zankman | |
| 4,416,182 A | 11/1983 | Wise et al. | |
| 4,820,165 A | 4/1989 | Kanapa | |
| 4,867,685 A | 9/1989 | Brush et al. | |
| 5,059,127 A | 10/1991 | Lewis et al. | |
| 5,169,342 A | 12/1992 | Steele et al. | |
| 5,261,823 A | 11/1993 | Kurokawa | |
| 5,302,132 A | 4/1994 | Corder | |
| 5,447,166 A | 9/1995 | Gevins | |
| 5,447,438 A | 9/1995 | Watanabe et al. | |
| 5,478,240 A | 12/1995 | Cogliano | |
| 5,486,112 A | 1/1996 | Troudet et al. | |
| 5,533,903 A | 7/1996 | Kennedy | |
| 5,574,238 A | 11/1996 | Mencher | |
| 5,584,699 A | 12/1996 | Silver | |
| 5,590,057 A | 12/1996 | Fletcher et al. | |
| 5,618,182 A | 4/1997 | Thomas | |
| 5,690,496 A | 11/1997 | Kennedy | |
| 5,727,951 A | 3/1998 | Ho et al. | |
| 5,746,605 A | 5/1998 | Kennedy | |
| 5,779,486 A | 7/1998 | Ho et al. | |
| 5,783,764 A | 7/1998 | Amar | |
| 5,797,130 A | 8/1998 | Nelson et al. | |
| 5,806,056 A | 9/1998 | Hekmatpour | |
| 5,810,605 A | 9/1998 | Siefert | |
| 5,820,386 A | 10/1998 | Sheppard | |
| 5,822,745 A | 10/1998 | Hekmatpour | |
| 5,827,066 A | 10/1998 | Henter | |
| 5,841,655 A | 11/1998 | Stocking et al. | |
| 5,842,868 A | 12/1998 | Phillips | |
| 5,870,731 A | 2/1999 | Trif et al. | |
| 5,870,768 A | 2/1999 | Hekmatpour | |
| 5,886,273 A | 3/1999 | Haruyama et al. | |
| 5,904,485 A | 5/1999 | Siefert | |
| 5,907,831 A | 5/1999 | Lotvin et al. | |
| 5,934,909 A | 8/1999 | Ho et al. | |
| 5,956,040 A | 9/1999 | Asano et al. | |
| 5,957,699 A | 9/1999 | Peterson et al. | |
| 5,987,302 A | 11/1999 | Driscoll et al. | |
| 5,987,443 A | 11/1999 | Nichols et al. | |
| 6,000,945 A | 12/1999 | Sanchez-Lazer et al. | |
| 6,020,886 A * | 2/2000 | Jacober et al. | 715/709 |
| 6,030,226 A | 2/2000 | Hersh | |
| 6,045,515 A | 4/2000 | Lawton | |
| 6,047,261 A | 4/2000 | Siefert | |
| 6,072,113 A | 6/2000 | Tohgi et al. | |
| 6,077,085 A | 6/2000 | Parry et al. | |
| 6,112,049 A | 8/2000 | Sonnenfeld | |
| 6,118,973 A | 9/2000 | Ho et al. | |
| 6,144,838 A | 11/2000 | Sheehan | |
| 6,155,971 A | 12/2000 | Calhoun et al. | |
| 6,164,971 A | 12/2000 | Figart | |
| 6,166,314 A | 12/2000 | Weinstock et al. | |
| 6,186,794 B1 | 2/2001 | Brown et al. | |
| 6,206,700 B1 | 3/2001 | Brown et al. | |
| 6,213,956 B1 | 4/2001 | Lawton | |
| 6,270,352 B1 | 8/2001 | Ditto | |
| 6,281,422 B1 | 8/2001 | Kawamura | |
| 6,288,315 B1 | 9/2001 | Bennett | |
| 6,293,801 B1 | 9/2001 | Jenkins et al. | |
| 6,334,779 B1 | 1/2002 | Siefert | |
| 6,336,813 B1 | 1/2002 | Siefert | |
| 6,352,475 B1 * | 3/2002 | Mraovic | 463/9 |
| 6,364,666 B1 | 4/2002 | Jenkins et al. | |
| 6,386,883 B2 | 5/2002 | Siefert | |
| 6,388,181 B2 | 5/2002 | Moe | |
| 6,390,918 B1 * | 5/2002 | Yagi et al. | 463/32 |
| 6,418,298 B1 | 7/2002 | Sonnenfeld | |
| 6,419,496 B1 | 7/2002 | Vaughn | |
| 6,435,508 B1 | 8/2002 | Tavel | |
| 6,480,698 B2 | 11/2002 | Ho et al. | |
| 6,484,010 B1 | 11/2002 | Sheehan | |
| 6,486,388 B2 | 11/2002 | Akahori | |
| 6,513,042 B1 | 1/2003 | Anderson et al. | |
| 6,514,084 B1 | 2/2003 | Thomas | |
| 6,526,258 B2 | 2/2003 | Bejar et al. | |
| 6,565,359 B2 | 5/2003 | Calhoun et al. | |
| 6,582,235 B1 | 6/2003 | Tsai et al. | |
| 6,629,892 B2 * | 10/2003 | Oe et al. | 463/40 |
| 6,644,973 B2 | 11/2003 | Oster | |
| 6,648,648 B1 | 11/2003 | O'Connell | |
| 6,676,412 B1 | 1/2004 | Masterson et al. | |
| 6,676,413 B1 | 1/2004 | Best et al. | |
| 6,688,889 B2 | 2/2004 | Wallace et al. | |
| 6,699,123 B2 * | 3/2004 | Matsuura et al. | 463/31 |
| 6,716,033 B1 | 4/2004 | Lassowsky | |
| 6,751,439 B2 | 6/2004 | Tice et al. | |
| 6,755,657 B1 | 6/2004 | Wasowicz | |
| 6,755,661 B2 | 6/2004 | Sugimoto | |
| 6,827,578 B2 | 12/2004 | Krebs et al. | |
| 6,905,340 B2 | 6/2005 | Stansvik | |
| 6,915,286 B2 | 7/2005 | Policastro et al. | |
| 6,978,115 B2 | 12/2005 | Whitehurst et al. | |
| 6,978,244 B2 | 12/2005 | Rovinelli et al. | |
| 7,024,398 B2 | 4/2006 | Kilgard et al. | |
| 7,122,004 B1 | 10/2006 | Cassily | |
| 7,182,600 B2 | 2/2007 | Shaw et al. | |
| 7,184,701 B2 | 2/2007 | Heslip | |
| 7,199,298 B2 | 4/2007 | Funaki | |
| 7,220,907 B2 | 5/2007 | McIntosh | |
| 7,294,107 B2 | 11/2007 | Simon et al. | |
| 7,451,065 B2 | 11/2008 | Pednault et al. | |
| 7,653,931 B1 | 1/2010 | Peterson et al. | |
| 7,775,866 B2 | 8/2010 | Mizuguchi et al. | |
| D627,681 S | 11/2010 | Lelardoux et al. | |
| 8,083,523 B2 | 12/2011 | De Ley et al. | |
| 8,137,106 B2 | 3/2012 | De Ley et al. | |
| 8,210,851 B2 | 7/2012 | Wade et al. | |
| 8,491,311 B2 * | 7/2013 | Bodner et al. | 434/323 |
| 8,577,280 B2 | 11/2013 | Hutchinson et al. | |
| D704,736 S | 5/2014 | Mariet et al. | |
| D765,139 S | 8/2016 | Hu | |
| D821,426 S | 6/2018 | Kim et al. | |
| D822,047 S | 7/2018 | Wills et al. | |
| D824,949 S | 8/2018 | Wu et al. | |
| 2001/0018178 A1 | 8/2001 | Siefert | |
| 2001/0023059 A1 | 9/2001 | Toki | |
| 2001/0036620 A1 | 11/2001 | Peer et al. | |
| 2001/0041330 A1 | 11/2001 | Brown et al. | |
| 2001/0046659 A1 | 11/2001 | Oster | |
| 2001/0055749 A1 | 12/2001 | Siefert | |
| 2002/0002411 A1 | 1/2002 | Higurashi et al. | |
| 2002/0005109 A1 | 1/2002 | Miller | |
| 2002/0032733 A1 | 3/2002 | Howard | |
| 2002/0042790 A1 | 4/2002 | Nagahara | |
| 2002/0076684 A1 | 6/2002 | Blevins et al. | |
| 2002/0102522 A1 | 8/2002 | Sugimoto | |
| 2002/0142278 A1 | 10/2002 | Whitehurst et al. | |
| 2002/0150868 A1 | 10/2002 | Yui et al. | |
| 2002/0160347 A1 | 10/2002 | Wallace et al. | |
| 2002/0168100 A1 | 11/2002 | Woodall | |
| 2002/0169822 A1 | 11/2002 | Packard et al. | |
| 2002/0177113 A1 | 11/2002 | Sherlock | |
| 2002/0188583 A1 | 12/2002 | Rukavina et al. | |
| 2003/0009352 A1 | 1/2003 | Bolotinikov et al. | |
| 2003/0017442 A1 | 1/2003 | Tudor et al. | |
| 2003/0017443 A1 | 1/2003 | Kilgore | |
| 2003/0027122 A1 | 2/2003 | Stansvik | |
| 2003/0039948 A1 | 2/2003 | Donahue | |
| 2003/0059759 A1 | 3/2003 | Calhoun et al. | |
| 2003/0077559 A1 | 4/2003 | Braunberger et al. | |
| 2003/0113697 A1 | 6/2003 | Plescia | |
| 2003/0129574 A1 | 7/2003 | Ferriol et al. | |
| 2003/0129576 A1 | 7/2003 | Wood et al. | |
| 2003/0148253 A1 | 8/2003 | Sacco et al. | |
| 2003/0151628 A1 | 8/2003 | Salter | |
| 2003/0151629 A1 | 8/2003 | Krebs et al. | |
| 2003/0157469 A1 * | 8/2003 | Embretson | 434/236 |
| 2003/0165800 A1 | 9/2003 | Shaw et al. | |

(56) References Cited

U.S. PATENT DOCUMENTS

| | | |
|---|---|---|
| 2003/0167902 A1 | 9/2003 | Hiner et al. |
| 2003/0167903 A1 | 9/2003 | Funaki |
| 2003/0176931 A1 | 9/2003 | Pednault et al. |
| 2003/0232318 A1 | 12/2003 | Altenhofen et al. |
| 2004/0005536 A1 | 1/2004 | Lai et al. |
| 2004/0007118 A1 | 1/2004 | Holcombe |
| 2004/0014017 A1 | 1/2004 | Lo |
| 2004/0014021 A1 | 1/2004 | Suleiman |
| 2004/0033475 A1 | 2/2004 | Mizuma et al. |
| 2004/0039603 A1 | 2/2004 | Hanrahan |
| 2004/0111310 A1 | 6/2004 | Sziam et al. |
| 2004/0137984 A1 | 7/2004 | Salter |
| 2004/0166484 A1 | 8/2004 | Budke et al. |
| 2004/0180317 A1 | 9/2004 | Bodner et al. |
| 2004/0237756 A1 | 12/2004 | Forbes |
| 2004/0244564 A1 | 12/2004 | McGregor |
| 2004/0260584 A1 | 12/2004 | Terasawa |
| 2005/0064375 A1 | 3/2005 | Blank |
| 2007/0046678 A1 | 3/2007 | Peterson et al. |
| 2007/0134630 A1 | 6/2007 | Shaw et al. |
| 2007/0257906 A1 | 11/2007 | Shimura et al. |
| 2007/0265083 A1 | 11/2007 | Ikebata |
| 2007/0281285 A1 | 12/2007 | Jayaweera |
| 2009/0081626 A1* | 3/2009 | Milgram et al. ............. 434/236 |
| 2009/0325137 A1 | 12/2009 | Peterson et al. |
| 2010/0209896 A1 | 8/2010 | Weary et al. |
| 2013/0244217 A1 | 9/2013 | Potts et al. |
| 2014/0186816 A1 | 7/2014 | Peterson et al. |

OTHER PUBLICATIONS

Thompson, Jon. Tetris Plus Review. [online], [retrieved on May 29, 2013]. Retrieved from the Internet <URL: http://www.allgame.com/game.php?id=1968&tab=review>.*

Hu, W. et al., "Dyanmics of Innate Spatial-Temporal Learning Process". 6th Annual International Conference on Complex Systems (May 2004).*

Bodner and Shaw, "Symmetry Math Video Game Used to Train Profound Spatial-Temporal Reasoning Abilities Equivalent to Dynamical Knot Theory" American Mathematical Society (2004); vol. 34; pp. 189-202.

Bodner and Shaw, "Symmetry Operations in the Brain: Music and Reasoning" (2001); pp. 1-30.

Bodner M, Shaw GL, "Music Math Connection" Journal of music and movement based learning. (2002) vol. 8, No. 3; pp. 9-16.

Bodner, Peterson, Rodgers, Shaw et al., "Spatial-Temporal (ST) Math Video Game Results Show Rapid Learning Curves Supportive of Innate ST Brain Function" Oct. 9, 2006; ScholarOne, Inc., 2000 (2001); 1 page.

Hu W, Bodner M, Jones EG, Peterson M, Shaw GL., "Dynamics of Innate Spatial-Temporal Learning Process: Data Driven Education Results Identify Universal Barriers to Learning" 6th Annual International Conference on Complex Systems (2004); 8 pages.

Hu W, Bodner M, Jones EG, Peterson MR, Shaw GL, "Data Mining of Mathematical Reasoning Data Relevant to Large Innate Spatial-Temporal Reasoning Abilities in Children: Implications for Data Driven Education" Soc. Neurosci. Abst. 34th annual meeting (2004); 1 page.

M.I.N.D.® Institute, Research Division, "Cramming v. Understanding", Position Paper #4, Feb. 2003, 1 page.

M.I.N.D.® Institute, Research Division, "Education=Music Math Causal Connection", Position Paper #1, Jul. 2002, 2 pages.

M.I.N.D.® Institute, Research Division, "The race to raise a brainer baby", Position Paper #2, Aug. 2002, 1 page.

M.I.N.D.® Institute, Research Division, "Trion Music Game: Breakthrough in the Landmark Math + Music Program", Position Paper #3, Jan. 2003, 1 page.

Peterson, Bodner, Rodgers, Shaw et al., Music—Math Program Based on Cortical Model Enhances 2nd Graders Performance on Advanced Math Concepts and Stanford 9 Math; Oct. 9, 2006; ScholarOne, Inc. (2000); 1 page.

Peterson, Bodner, Shaw et al., "Innate Spatial-Temporal Reasoning and the Identification of Genius" Neurological Research, vol. 26, Jan. 2004; W.S. Maney & Son Ltd.; pp. 2-8.

Peterson, Shaw et al., "Enhanced Learning of Proportional Math Through Music Training and Spatial-Temporal Training" Neurological Research(1999) vol. 21; Forefront Publishing Group; pp. 139-152.

Shaw et al., "Music Training Causes Long-Term Enhancement of Preschool Children's Spatial-Temporal Reasoning" Neurological Research (1997); vol. 19, No. 1; pp. 1-8; Forefront Publishing Group, Wilton, CT, USA.

Shaw GL, Bodner M, Patera J "Innate Brain Language and Grammar: Implications for Human Language and Music" In Stochastic Point Processes (eds Srinivasan SK and Vihayakumar A). Narosa Publishing, New Dehli (2003); pp. 287-303.

Shaw, G.L., "Keeping Mozart in Mind," M.I.N.D. Institute/ University of California, Academic Press, 2000, Cover Page, Table of Contents, Chapters 2, 12, 13, 14, 18, 19, 20, 23.

Special Report—Summary of the 2002 M.I.N.D.® Institute newsletter which details data from 2nd graders in our Music Spatial-Temporal Math Program (2002) vol. 1, Issue 2; pp. 1-12.

Today@UCI: Press Release: Piano and Computer Training Boost Student Math Achievement, UC Irvine Study Shows [online]; Mar. 15, 1999 [retrieved on Mar. 16, 2008]; Retrieved from the Internet: URL:http://today.uci.edu/news/release_detail.asp?key=646.

Watson S. Wind M, Yee M, Bodner M, Shaw GL., "Effective Music Training for Children with Autism" Early Childhood Connections, (2003); vol. 9; pp. 27-32.

International Search Report, Application No. PCT/US06/34462, dated Aug. 30, 2007, 2 pgs.

"The Stochastic Learning Curve: Optimal Production in the Presence of Learning-Curve Uncertainty", Joseph B. Mazzola and Kevin F. McCardle; Source: Operations Research, vol. 45, No. 3 (May-Jun. 1997), pp. 440-450.

"Toward a Theory of continuous Improvement and the Learning Curve", Willard I. Zangwill and Paul B. Kantor; Management Science, vol. 44, No. 7 (Jul. 1998), pp. 910-920.

"Rigorous Learning Curve Bounds from Statistical Mechanics" by David Haussler, Michael Kearns, H. Sebastian Seung, Naftali Tishby, (1996), Machine Learning 25, pp. 195-236.

"Seer: Maximum Likelihood Regression for Learning-Speed Curves", Carl Myers Kadie, Graduate college of the University of Illinois at Urbana-Champaign, 1995, pp. 1-104.

Yelle, Louis E., "The Learning Curve: Historical Review and Comprehensive Survey", *Decision Sciences,* vol. 10, Issue 2, pp. 302-328 (Apr. 1979).

Restriction-Election Requirement for U.S. Appl. No. 13/729,493, dated Mar. 30, 2015.

Response to Election/ Restriction for U.S. Appl. No. 13/729,493, dated May 7, 2015.

Non-Final Rejection (1) for U.S. Appl. No. 13/729,493, dated Jun. 26, 2015.

Response after Non-Final Action (1) for U.S. Appl. No. 13/729,493, dated Sep. 25, 2015.

Non-Final Rejection (2) for U.S. Appl. No. 13/729,493, dated Dec. 7, 2015.

Response after Non-Final Action (2) for U.S. Appl. No. 13/729,493, dated Mar. 7, 2016.

Final Rejection for U.S. Appl. No. 13/729,493, dated May 25, 2016.

Response after Final Action for U.S. Appl. No. 13/729,493, dated Oct. 25, 2016.

Notice of Allowance for U.S. Appl. No. 13/729,493, dated Dec. 16, 2016.

Response to Reasons for Allowance for U.S. Appl. No. 13/729,493, dated Mar. 14, 2017.

* cited by examiner

SYSTEM AND METHOD FOR TRAINING WITH A VIRTUAL APPARATUS

RELATED APPLICATIONS

This is a continuation of copending application Ser. No. 11/218,282 filed Sep. 1, 2005, which is hereby incorporated by reference in its entirety.

BACKGROUND OF THE INVENTION

1. Field of the Invention

The invention relates to training, and more particularly, to use a virtual apparatus via a computer animation executed by a computer environment without needing language interaction.

2. Description of the Related Technology

In the 1970's Dr. Gordon Shaw, a founder of the M.I.N.D. Institute, pioneered the area of spatial temporal reasoning and noted that American education had historically overly focused on the LA (Language-Analytical) portion of human reasoning, and substantially overlooked ST (Spatial-Temporal) reasoning as a learning mode. Since then, our understanding of how the brain works, and how learning takes place has increased. Gaining this understanding is an ongoing dynamic process.

Unfortunately, while a doctor from the mid $19^{th}$ century would be lost, and a menace, both to himself, and to patients, in a 2005 United States hospital, a school teacher from 1850 would likely feel at home in today's classrooms, once she recovered from fainting at the girl's customary attire. While the world has dramatically changed in the last 150 years, teaching methods have not kept up. Generally, computing power is relegated to an adaptive and adjunct role, rather than to develop new learning paradigms. This state of events is unsatisfactory, and cannot be tolerated.

Admittedly, education systems face daunting challenges. Cultural and linguistic homogeneity have sharply decreased. In the United States, teachers can no longer presume that all students speak English. In some school districts, numerous languages are spoken at children's homes. The historical demand that children acclimate to America, and learn only English, has diminished. Many students lack effective family support systems. Television, video games, and computer games, compete with homework for students after school attention, and the federal government, through partially or totally unfunded mandates, requires schools to do more, with fewer resources.

Additionally, early childhood education, education of those for who English is a second language, and educating the learning disabled are growth areas. While preschool children may, or may not, understand spoken English, there is no reason to presume that they read English. Additionally, many people, regardless of age, are illiterate. As the supply of good jobs for those having little formal education dries up, the need for creative educational paradigms increases.

While infrastructure is becoming available, this alone cannot solve the problem. Computers offer wondrous opportunities to expand learning, but a paradigm to generate a quantum leap in educational results is lacking. True, students can now do on-line research, and create computerized presentations for class instead of typed or handwritten reports. They can search through billions of references by using Internet search programs. However, this is merely incrementally improving an existing educational process many view as grossly inadequate. Regardless, we have not addressed how to help students reason and think. As previously mentioned the language gap in schooling is a continuing problem.

Using manipulatives in teaching mathematics began at least in the 1980's, and possibly well before. This accesses different reasoning pathways, (Spatial-Temporal) than does dealing merely with abstractions. Virtual manipulatives have been created as computer-generated images. However, these manipulatives have merely been used as an adjunct or supplement to spoken or textual language, rather than a replacement therefore. Further, virtual manipulative lack important aspects of real world objects.

In the real world, objects are subject to physical laws learned even by toddlers. For example, generally an object, when released, neither hovers, nor rises, but falls to the ground. An object at rest remains so unless acted upon. A hole is something to fall into. Free objects above the ground fall. In general, objects follow predictable rules. While a virtual manipulative looks like the real thing, it need not behave so, unless placed in a logical construct where it is constrained. We define such a constrained virtual manipulative as a virtual apparatus.

Traditionally, students learn subjects via the written or spoken word. By definition, language translates the concrete into the abstract. Therefore, in all such learning, language ability is a choke point or limiting factor. Such a limiting factor is often unnecessary. Consider the problem, 2+2=4. Placing two blocks next to two blocks provides four blocks, without any resort to language or symbolism. Imagine a construct where selecting two additional blocks creates a successful result.

While bridging the language gap at some point likely needs to be done, no a priori reason exists for all instruction to be language based. A chemistry or physics experiment is NOT language based, but has real world results. Similar geometric experiments exist. When imparting learning from a subject, or discipline, conveyable primarily or purely through physical means, such as virtual apparati, introducing language abstractions in the learning process is an unnecessary complicating, and hindering factor.

Originally, counting was by pebbles, twigs, or other physical means. Additionally, subtraction, algebra, story problems, geometry, and many other subjects can be taught without using language. This is beneficial for various reasons. First, as the problem is inherently physical, there is no underlying reason to convert the problem from the physical realm into the abstract realm. Secondly, if the problem remains in the physical realm, the realm of spatial temporal reasoning, rather than the realm of language—analytical reasoning, then language skills are no longer either a limiting or a complicating factor. Third, if the problem is language independent, the students' English skills are irrelevant.

Imagine a classroom where 25 children who speak seven different languages can solve the same problem from the same computer program. A single version of a single problem is comprehensible and solvable to speakers of any language, or none at all. The same logical rules would be applicable to each subject. Reasoning, logic, math, science, and more, all taught without need for textual symbols.

Admittedly, a language transition would be required to transfer the learning skills from this logical construct into the broader logic of the physical world. However, this process is primarily relabling previously learned facts and thought processes, and adapting thought processes to a broader perspective.

A need exists for a paradigm for teaching subjects using physical representations, such as a virtual apparatus, where using language is unnecessary, and then addressing the language gap after substantial learning occurs. Likewise, a need exists for methods of teaching processes that do not rely on unnecessary single or double translations between concrete and abstract thought processes. Further, a need exists for software that enables this new educational method.

SUMMARY OF CERTAIN INVENTIVE ASPECTS

Certain embodiments include a computer based learning method, and implementing software that implements a new learning paradigm. This method of learning/method of teaching implements advances in the understanding of spatial temporal (ST) reasoning to allow students to learn without relying on language or language analytical (LA) reasoning.

Accordingly, this method applies to any subject matter where ST reasoning applies. This method is particularly applicable for use with students having learning disabilities, limited language skills, or limited English skills in English based learning environments.

In one embodiment of the invention there is a method of training in conjunction with a computer animation executed by a computing environment, the method comprising creating a logical construct including establishing a set of consistent rules, providing a virtual apparatus with virtual components that are manipulated by a user being trained, teaching the user to understand logically consistent goals by using the virtual apparatus and without language interaction, modeling properties and the set of consistent rules for a subject area to the user by the virtual apparatus without language interaction, teaching the user to operate the virtual apparatus without language interaction, requesting the user to operate the virtual apparatus to reach goals in a sequence of problems having progressive difficulty and without language interaction.

The method may additionally comprise selecting an appropriate subject matter area, and selecting a sequence of problems according to the selected subject matter area. The method may additionally comprise establishing error tolerances for the problems. The method may additionally comprise determining if the user has mastered a subject area sub-category. The method may additionally comprise introducing language elements to the user in conjunction with the computer animation if the user has mastered a subject area sub-category. The language elements may comprise numerals and/or labels.

In another embodiment of the invention there is a method of training in conjunction with a computer animation executed by a computing environment, the method comprising recognizing a task to be performed in the computer animation, recognizing a problem, displayed in the computer animation, to accomplish the task, and solving the problem by manipulation of a virtual apparatus executing in the computing environment.

The method may additionally comprise animating positive feedback to a user if the problem was solved correctly. Animating positive feedback may comprise showing the user why the problem was solved correctly. The method may additionally comprise introducing language elements to the user in conjunction with the computer animation. The language elements may comprise numerals and/or labels. The language elements may be added to the display near the virtual apparatus. The language elements may be added to the display in place of portions of the virtual apparatus. The method may additionally comprise solving a new problem in a language-analytic environment wherein the new problem and the solved problem are related to a concept being taught. The method may additionally comprise animating negative feedback to a user if the problem was not solved correctly. Animating negative feedback may comprise showing the user why the problem was not solved correctly.

The method of training may be self-contained. Solving the problem may utilize spatial temporal reasoning. The method may additionally comprise designating a task to be performed in the computer animation. The computer animation may include only essential images. The positive feedback computer animation may include only essential output. The negative feedback computer animation may include only essential output.

In another embodiment of the invention there is a method of training in conjunction with a computer animation executed by a computing environment, the method comprising recognizing a task to be performed in the computer animation, recognizing a problem, displayed in the computer animation, to accomplish the task, and solving the problem using a virtual apparatus with virtual components displayed in the computer animation. The method of training may be without intervention and instruction by a teacher.

In another embodiment of the invention there is a system for training, the system comprising a computing environment executing a computer animation, means for recognizing a task to be performed in the computer animation, means for recognizing a problem, displayed in the computer animation, to accomplish the task, and a virtual apparatus with virtual components displayed in the computer animation for solving the problem.

In another embodiment of the invention there is a computer readable medium containing software that, when executed, causes the computer to perform the acts of recognizing a task to be performed in a computer animation, recognizing a problem, displayed in the computer animation, to accomplish the task, and solving the problem using a virtual apparatus with virtual components displayed in the computer animation.

In another embodiment of the invention there is a method of training, the method comprising providing a virtual apparatus with virtual components that are manipulated by a user being trained, and teaching the user to understand logically consistent goals by using the virtual apparatus and without language interaction.

In another embodiment of the invention there is a computer readable medium containing software that, when executed, causes the computer to perform the acts of providing a virtual apparatus with virtual components that are manipulated by a user being trained, and teaching the user to understand logically consistent goals by using the virtual apparatus and without language interaction.

In another embodiment of the invention there is a method of training, the method comprising providing a virtual apparatus with virtual components that are manipulated by a user being trained, and modeling rules and properties for a subject area to the user by the virtual apparatus without language interaction.

In another embodiment of the invention there is a computer readable medium containing software that, when executed, causes the computer to perform the acts of providing a virtual apparatus with virtual components that are manipulated by a user being trained, and modeling rules and properties for a subject area to the user by the virtual apparatus without language interaction.

In another embodiment of the invention there is a method of training, the method comprising providing a virtual apparatus with virtual components that are manipulated by a user being trained; and teaching the user to operate the virtual apparatus without language interaction.

In another embodiment of the invention there is a computer readable medium containing software that, when executed, causes the computer to perform the acts of providing a virtual apparatus with virtual components that are manipulated by a user being trained, and teaching the user to operate the virtual apparatus without language interaction.

In another embodiment of the invention there is a method of training, the method comprising providing a virtual apparatus with virtual components that are manipulated by a user being trained, and requesting the user to operate the virtual apparatus to reach goals in a sequence of problems having progressive difficulty and without language interaction.

In yet another embodiment of the invention there is a computer readable medium containing software that, when executed, causes the computer to perform the acts of providing a virtual apparatus with virtual components that are manipulated by a user being trained, and requesting the user to operate the virtual apparatus to reach goals in a sequence of problems having progressive difficulty and without language interaction.

DETAILED DESCRIPTION OF CERTAIN INVENTIVE EMBODIMENTS

Figure 1A:
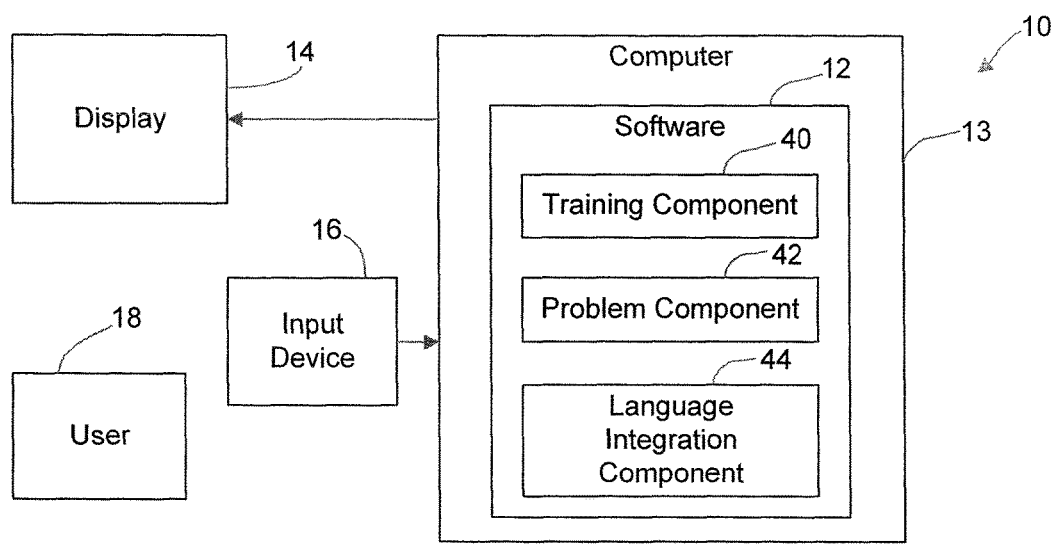
FIG. 1A is a high level block diagram of one embodiment of a system for teaching rules for educational games without the use of words.

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The system is comprised of various modules, tools, and applications as discussed in detail below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system modules, tools, and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, BASIC, Visual Basic, Pascal, Ada, Java, HTML, XML and FORTRAN are industry standard programming languages for which many commercial compilers can be used to create executable code.

A computer or computing device may be any processor controlled device including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers may be equipped with a network communication device such as a network interface card, a modem, or other network connection device suitable for connecting to a communication network. Furthermore, the computers execute an appropriate operating system such as Linux, UNIX, any of the versions of Microsoft Windows, Apple MacOS, IBM OS/2 or other operating system. The appropriate operating system may include a communications protocol implementation that handles all incoming and outgoing message traffic passed over the network The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The method and system applies to teaching a wide variety of disciplines and minimizes or eliminates abstractions or symbols while teaching using constrained virtual manipulatives defined as a virtual apparatus. The constraints require the virtual manipulatives to behave in accordance with easily learned rules. While symbols or abstractions may be added to the displayed puzzles, the crux of the learning is accomplished without having to resort to such abstractions. The method used by certain embodiments comprises three phases.

In one embodiment, the initial phase is a tutorial, which teaches the user how to use the implementing software. The tutorial is fully informative without using written or spoken language. One key technique is impoverishing the visual environment. Consider, for example, the old video game commonly known as PONG which comprised a monochromatic monitor, each player's virtual paddles, and a cathode-ray tube trace which functioned as a virtual ball, which was constrained by the physical constraint that the angle of incidence equaled the angle of reflection. After the user has demonstrated mastery of the tutorial, he or she may proceed to an initial subject matter puzzle.

The method involves creating single and multi-step puzzles, arranged hierarchically. The learning process involves having the user complete a non-textual training stage, and a non-textual learning stage. In one embodiment, the method progresses from non-textual puzzles to puzzles including text to bridge the language gap. The method and software are suitable for all users, as the non-textual learning puzzles and solutions are language independent.

Regardless of the academic discipline, puzzles are solved the same way. Each puzzle constitutes an impassable success path, and comes with a set of possible solutions. Each solution set, and each set member, consists of virtual apparatus. In the preferred embodiment, in accord with learning theory best practices, each solution set member depicts a logically true statement. Ideally, each solution consists of one or more virtual manipulatives. The user selects a possible solution. The software applies the selected solution to the success path. The correct solution makes the success path passable. An incorrect solution leaves the success path impassable. Preferably, user selected incorrect solutions remains visible as user resources. Preferably, additional success indicators are used, such as an animated figure with easily learned movement rules traveling the entire path. Preferably, the software displays only essential information and graphics. The method uses a computer with display, a user controlled input device, and preferably, ways for user identification, score recordation, and score analysis.

Figure 1B:
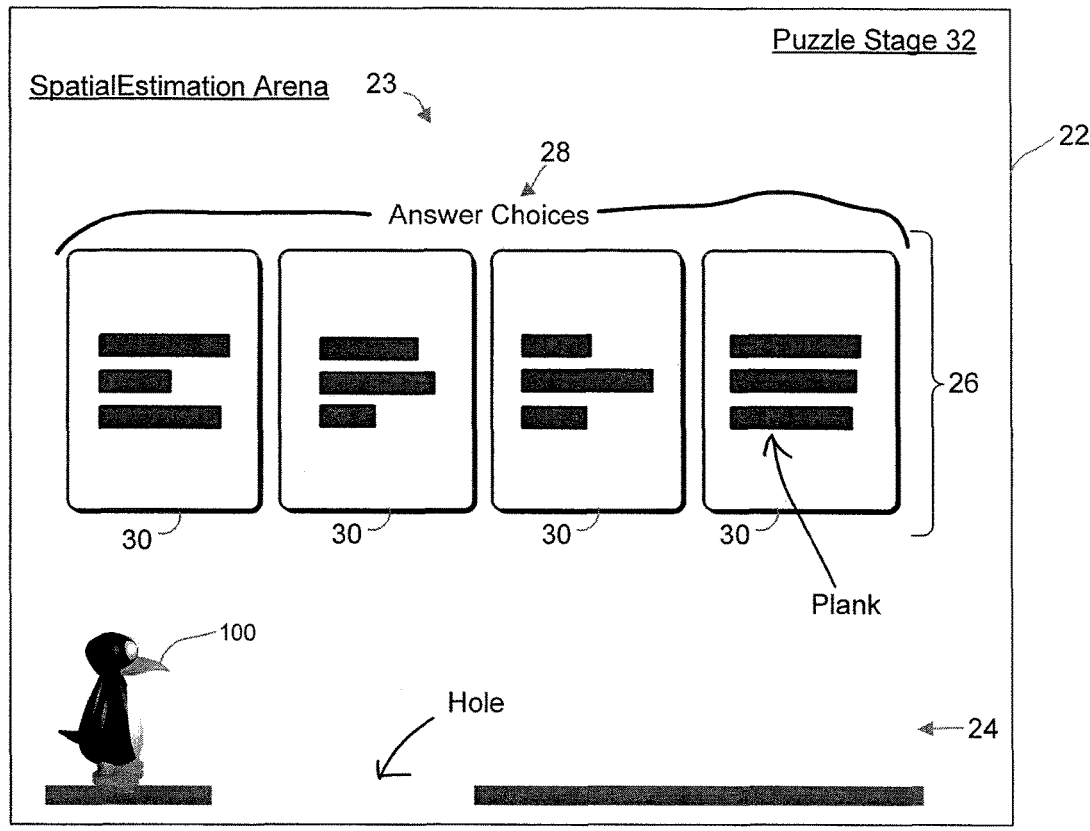
FIG. 1B is a block diagram of an exemplary problem at a puzzle stage and at a solution stage that can be performed on the system shown in FIG. 1A.
Figure 1B:
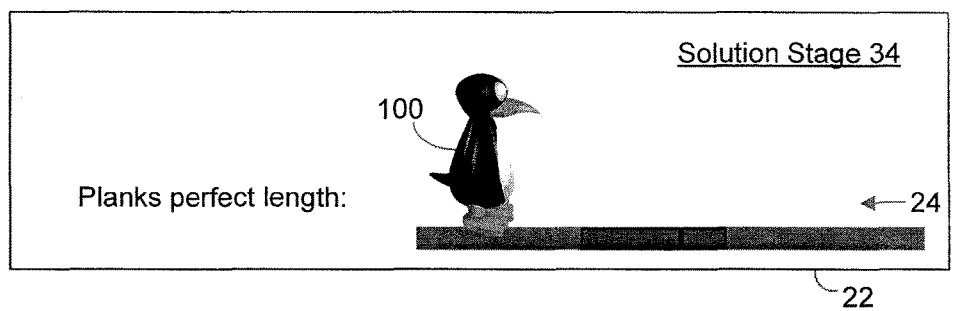

Referring to FIGS. 1A and 1B, a system 10 comprises software 12, designed to be used with a computer 13 having a display 14, and a user controlled input device 16. The system 10 teaches students or users 18 a selected academic discipline by means of puzzles 22, where each puzzle 22 comprises an arena 23 which comprises a success path 24, and virtual apparatus 26 controlled by student 18 by means of input device 16. During the presentation of each puzzle 22, virtual apparatus 26 comprises a solution set 28 having potential answers 30. At a puzzle stage 32, success path 24 is impassable. Each puzzle 22 is solved by the student 18 selecting a proper virtual apparatus 26, through input device 16, that when applied to success path 24, changes success path 24 from impassable to passable, changing puzzles 22 from puzzle stage 32 to solution stage 34. Although the description refers to students, it also applies to any user desiring to learn something new.

Software 12 comprises a training component 40 and a puzzle or problem component 42. A language integration component 44 may also be provided as described below. Note that software 12 may allow a puzzle 22 to teach students 18 a part of both puzzle component 42 and language integration component 44. As shown particularly well in Example 1-3 (shown in Appendix C) and Example 1-4 (shown in Appendix D), language skills are introduced in tandem with the already learned spatial-temporal (ST) representations used to teach the applicable concepts. Therefore, student 18 does not require high level language-analytical (LA) skills to identify the previously learned ST skills in the prevalent LA environment. Although the description refers to puzzles, it also applies to any type of problem to be solved.

As also shown by examples 1-1 through 1-7 (shown in the Appendices), ST skills can teach a variety of concepts from the geometric, to fractions, multiplication, ratios, and more. Embedding text seamlessly into previously learned ST skills is believed to both maximize learning and minimize detriments caused by possible language skill deficiencies in students 18.

Training component 40 presents students 18 with puzzles 22 which teach students 18 the rules of the logical construct selected for the system 10. Mastery of training component 40 allows student access to puzzle component 42, as described below.

In certain embodiments, puzzle component 42 comprises puzzles 22 which are organized into bins and levels. Puzzles 22 teach students 18 through the utilization of ST reasoning.

Figure 2A:
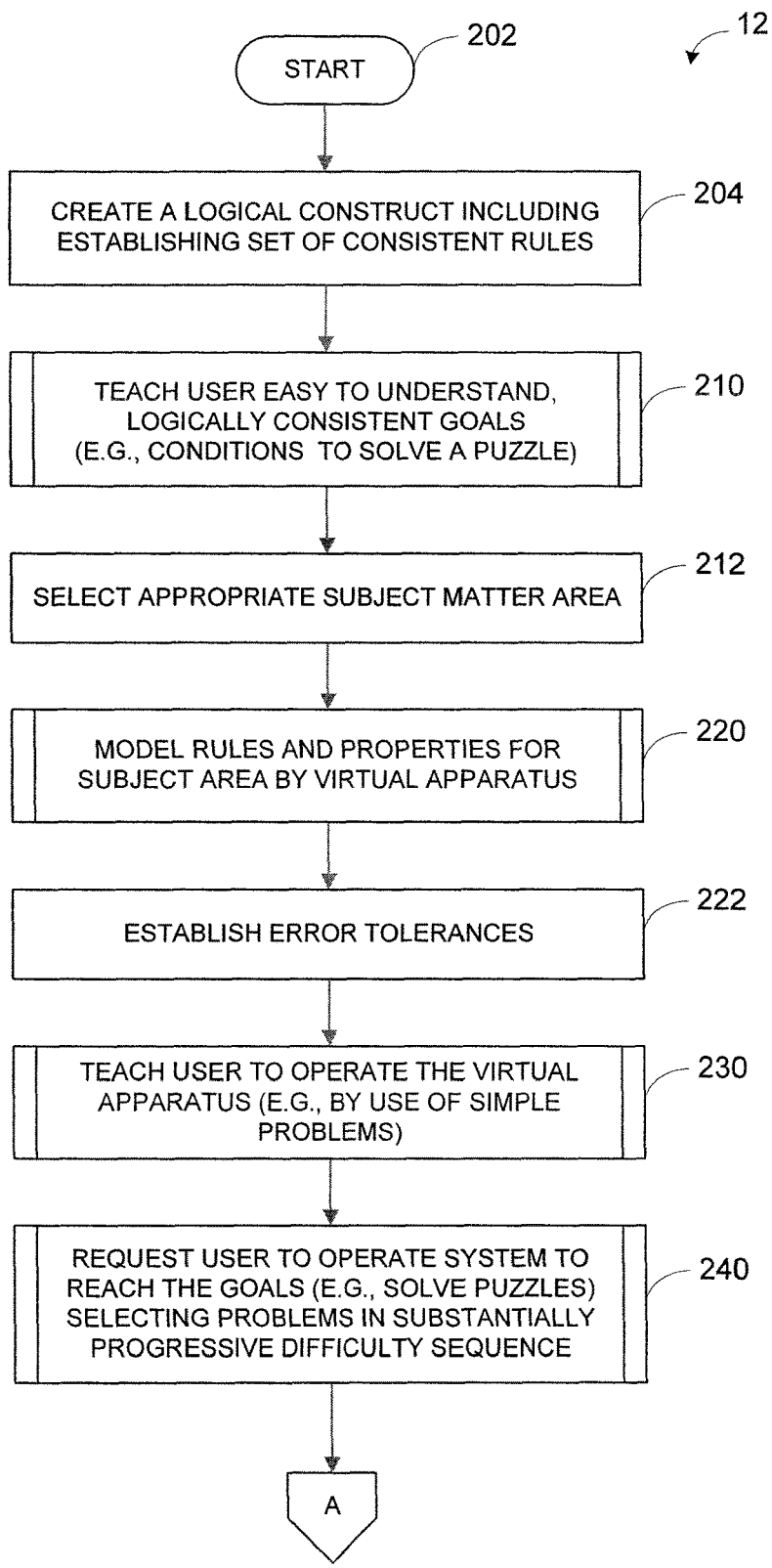
FIGS. 2A and 2B are a top level flowchart of exemplary software processes that can be executed on the system shown in FIG. 1A.
Figure 2B:
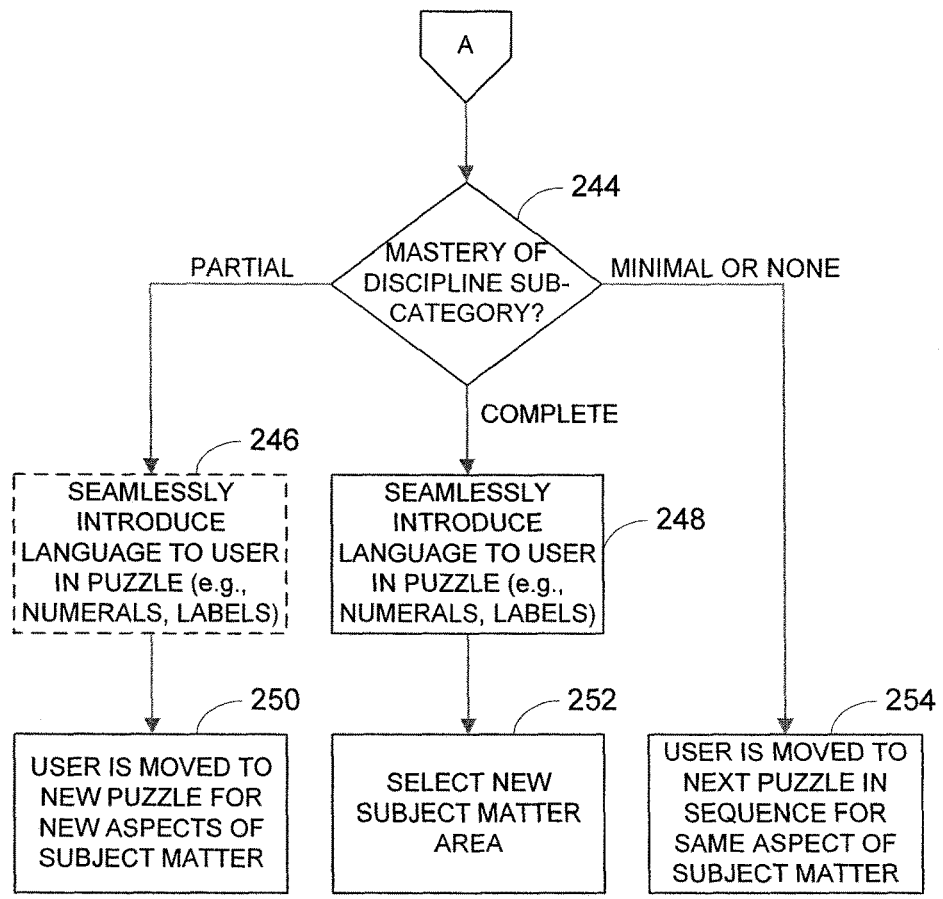

Referring to FIGS. 2A and 2B, a top level flowchart of exemplary software processes of software 12 (FIG. 1A) that can be executed on the system 10 will be described. System 10 teaches students 18 via ST reasoning in a particularly effective manner by utilizing software 12.

| | |
|---|---|
| 1) Create a logical construct - see state 204. | This act requires establishing consistent rules. |
| 2) Teach a user easy-to-understand, logically consistent goals - see process 210. Process 210 will be further described in conjunction with FIG. 4. | In one embodiment, the goals are the conditions to solve a puzzle. |
| 3) Select appropriate subject matter areas - see state 212. | Select the appropriate material to teach. |

-continued

| | |
|---|---|
| 4) Divide each selected subject matter into parts consisting of rules and properties. | |
| 4a) Virtual apparatus models rules and properties - see process 220. Process 220 will be further described in conjunction with FIG. 5. | For example, shapes tightly fit holes having the analogous receiving shape. A penguin can only go up and down ladders, or walk on completely smooth paths. |
| 4b) Establish error tolerances - see state 222. | Some problems have no allowable error. For example, 2 + 2 = 4. No error tolerance applies. For a problem involving estimation, an appropriate error tolerance is set. |
| 5) Teach the user to operate virtual apparatus - see process 230. Process 230 will be further described in conjunction with FIG. 6. | Use simple problems as teaching tools. A special training level may serve this purpose. |
| 6) Request the user to operate the virtual apparatus to reach the pre-defined and pre-understood goal - see process 240. Process 240 will be further described in conjunction with FIG. 7. | This can include requests such as "Solve puzzle" or "Fix success path." |
| 7) Does the user operate the apparatus successfully? See decision state 706 of FIG. 7. If YES go to 7a, if NO go to 7b. | Was puzzle solved? Was success path fixed? |
| 7a) If YES, provide a success indicator. See state 708 of FIG. 7. | These depend upon the rules established above. The possibilities are endless. A penguin could follow a path. A log or girder could bridge a gap. Ideally, this is more than a green check, or a "YES". Ideally, more than one success indicator appears. |
| 7aa) Preferably a success indicator illustrates WHY user was successful. See state 710 of FIG. 7. GO TO 8. | This is rules and puzzle dependent. |
| 7b) If NO, provide lack of success indicator. See state 712 of FIG. 7. | This is more than the lack of a success indicator, and preferably more than a red light, a red "X" or similar. For example, a penguin cannot pass a hole or an obstruction. The path across a bridged gap has more vertical displacement than the length of the provided ladder. |
| 7bb) Preferably lack of success indicators show WHY the user was not successful. See state 714 of FIG. 7. GO TO 8. | The lack of success indicator can be a partially filled hole or an obstruction that blocks movement. The remaining gap could be beyond the ladder's reach. The amount of error is visually apparent. A hole is over filled by a number of blocks, or underfilled. A shape fits the hole in the path, but is displaced. |
| 8) Preferably, present puzzles in a substantially progressive difficulty sequence - see process 240. Process 240 will be further described in conjunction with FIG. 7. | This enables positive reinforcement and structured success. Learner enthusiasm and self image are enhanced by providing initial successes, when possible. |
| 8a) Preferably, vary puzzle sequence (through something like pseudo-random selection from a pool of puzzles in appropriate bins). | This variation minimizes memorization while maintaining substantial benefits from the above-identified puzzle progression. |
| 9) Has user mastered the appropriate discipline sub-category? See decision state 244 of FIG. 2B. YES or NO. | Educational theory suggests breaking mastery down into appropriate sub-disciplines. Certain puzzles, when combined with certain accumulated scores, or puzzle solution histories, suggest sub-category mastery. |
| 9a) If NO, move user to next puzzle in sequence. See state 254 of FIG. 2B. | Systematic puzzle sequencing within bins. |
| 9b) If YES, user moves on to new puzzles that probe new subject matter aspects. See state 250 of FIG. 2B. | Systematic bin sequencing. |
| 9c) If subject matter area is mastered, select new subject matter area. See state 252 of FIG. 2B. | This selection may be fixed, result determined teacher determined, student determined, or other. |
| 10) The system and puzzles may be language-free, or may use language. | Spatial temporal reasoning may minimize, or eliminate the need for language. Language may also be used to satisfy marketing needs and be within the method and system. |
| 11) Language-incorporating puzzles bridge the language gap. See state 248 and optionally state 246 of FIG. 2B. | Even if the system is ST based, much of the world is LA based. While the system and method teach in a ST universe, at some point, the accumulated learning received from the system is to be related by the student to a primarily LA environment. When mastery of |

-continued discipline sub-category is complete, the software seamlessly introduces language to the user in the puzzle (state 248), such as via numerals, labels, etc. See the example problems/puzzles in the appendices for examples of introducing language in the puzzle. The software 12 can optionally introduce language to the user in the puzzle at state 246 when there is partial mastery of the discipline sub-category as desired.

Figure 3:
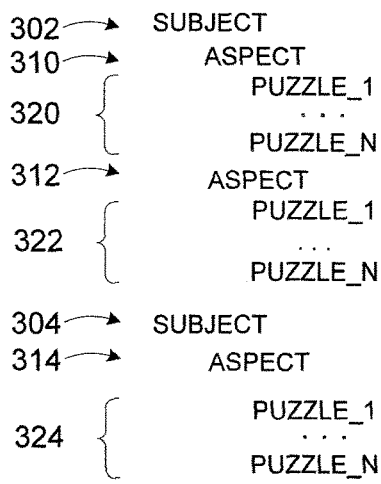
FIG. 3 is a diagram of an exemplary hierarchy of subjects, aspects and puzzles for aid in understanding states 250, 252 and 254 of FIG. 2B.

Referring to FIG. 3, an exemplary hierarchy of subjects, aspects and puzzles is shown as an aid in understanding states 250, 252 and 254 of FIG. 2B. Subject matter areas 302 and 304 are shown as being at a first level of hierarchy; aspects 310, 312 (of subject 302), and 314 (of subject 304) are shown as being at a second level of hierarchy; and puzzles 1 to N (320) corresponding to aspect 310, puzzles 1 to N (322) corresponding to aspect 312, and puzzles 1 to N (324) corresponding to aspect 314 are shown as being at a third level of hierarchy.

Certain underlying counterintuitive techniques enhance the effectiveness of the system 10 (FIG. 1A). An underlying principle is simplifying the graphics generated by software 12 and viewed upon display 14. The progression of video games since the game PONG has taught the exact opposite. For purposes of illustration, examples are set forth in the appendices to clearly illustrate features of the system 10.

In the system 10, an animated FIG. 100, known as JiJi, appears in puzzles 22, and is both a success indicator and a lack of success indicator depending upon whether student 18 has selected a proper member of a solution set to make the success path passable, and take the puzzle from the puzzle stage to the solution stage. Of course, other animated figures can be used in other embodiments.

The version of Seed described in Appendix H has several non-obvious differences from the prior art version. First of all, the present version is self-contained, and thus does not require intervention and/or instruction by a teacher. In the prior art versions of Big Seed, and other puzzles, teacher intervention and instruction is essential to enable the puzzles to provide a learning experience. Second, at least some phases of the current puzzle are self-contained in ST space and do not require that the student receives LA space input. Third, it has been determined that the student receives a better quality learning experience when the arena stage is impoverished.

This is counterintuitive. Video games theory over the past twenty plus years has emphasized more and more graphics, and a richer video environment to attract the user's attention. Impoverishing the video environment enhances the student's learning experience, and allows students to gain maximum benefit from ST reasoning. In an impoverished environment, only essential images or output are included in an animation of the problem and puzzle and any positive or negative feedback to the user, in one embodiment. Essential images include only those images that are directly involved in the puzzle/problem and its solution. Output related to unnecessary movement on the screen, or graphics not involved in puzzle solution are not essential. Essential images are of a minimum complexity in that they contain little or no information that is not directly related to the problem. Research was conducted on a typical puzzle, identified as "bricks." The "bricks" example shown in Appendix I demonstrates the differences between an impoverished and non-impoverished environment in the puzzle. The advantages of the impoverished environment are typical of the puzzles utilized in the system 10.

The system has great potential for assisting a wide variety of students. Specially suited student populations include pre-school students, elementary students, learning disabled students, hearing impaired students, students with low achievement levels in language arts, as well as students lacking language skills in a particular language, even though their overall LA reasoning may be average or above.

As demonstrated in research articles, it is believed that ST reasoning based puzzles may also be used to identify those possessing gifted intelligence or genius qualities. The early identification of the gifted student is essential to maximizing the inherent capacities possessed by such learners.

The system may utilize alphanumeric identifying indicia without requiring the student to utilize LA reasoning in the puzzle solution process. One or a small series of letters or numbers may well serve to identify which alternative process is employed in a multi-process puzzle. For example "GCF" or "LCM" serve as distinctive shapes easily recognized by the student, without any requirement that the student associate the symbols with particular letters or words. Other nonsense symbols could be employed. However, as ultimate integration of ST reasoning into a primarily LA world remains an ultimate goal of the system 10, utilizing alphanumeric identifying indicia can be a valuable aid in the eventual LA integration process.

Figure 4:
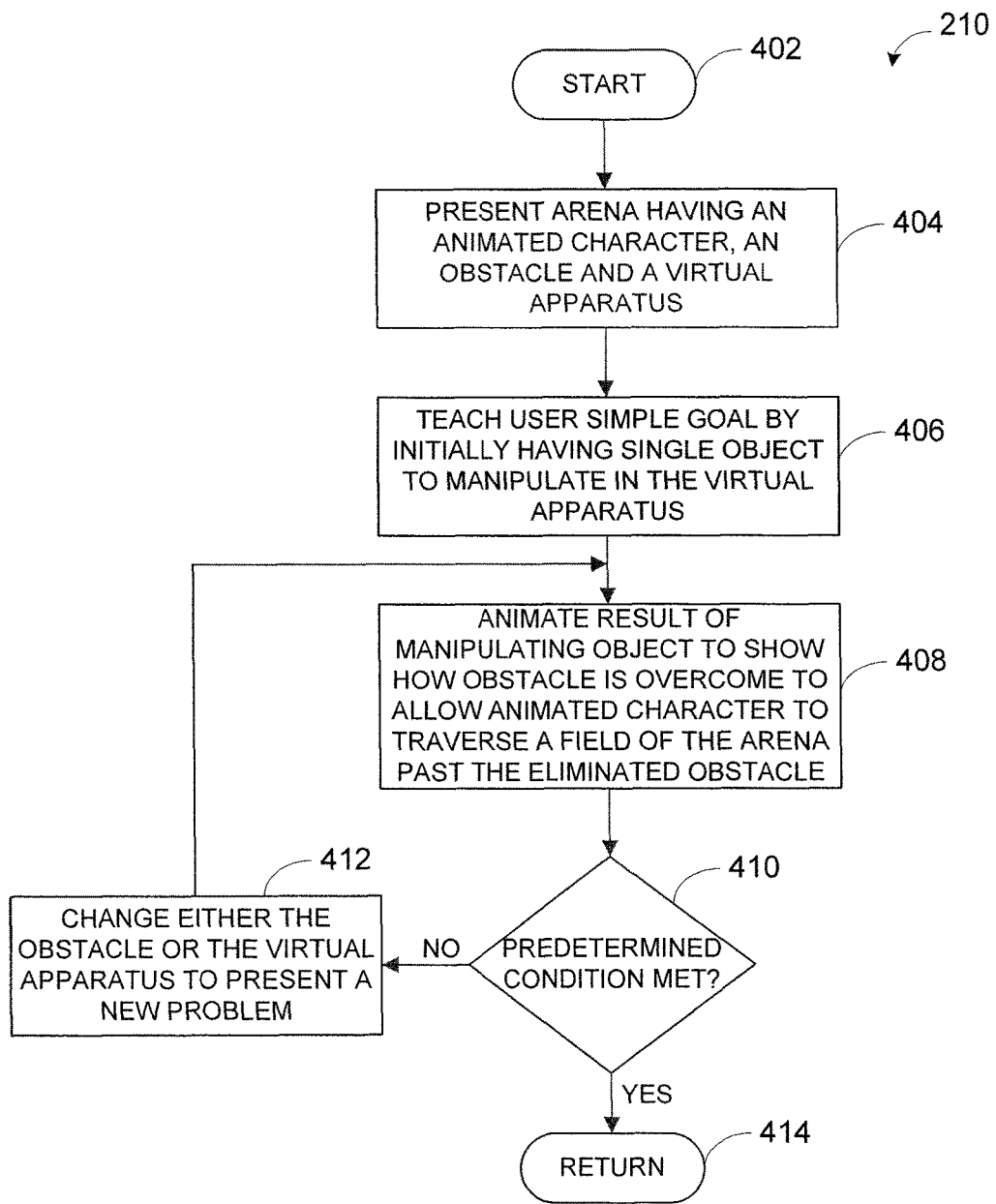
FIG. 4 is an exemplary flowchart of the process 210 shown in FIG. 2A.

Referring to FIG. 4, the process 210 previously shown in FIG. 2A will be described. Process 210 is used by system 10 to teach a user easy to understand, logically consistent goals.

Process 210 begins at a start state 402 and proceeds to state 404 to present an arena having an animated character, an obstacle and a virtual apparatus, in certain embodiments. Proceeding to state 406, process 210 teaches the students a simple goal. In certain embodiments, a goal is to get JiJi, an animated penguin 100 (FIG. 1B), to move across the display screen and past some obstacle. To meet this goal, the student knows that they have to do something. By "doing something", they have to perform a series of mouse clicks on the right objects on the screen to remove the obstacle and make the path passable. The system 10 teaches this by starting out with the simplest games. These games can include only a single object to click on or manipulate. Proceeding to state 408, clicking on the object will cause an animation of manipulating the object to show how the obstacle is overcome so as to allow the animated character to traverse a field of the arena past the eliminated object. In certain embodiments, the obstacle is removed, and the penguin walks across the screen.

In one embodiment, such as where the user is using the system 10 for the first time, state 404 may present an arena having only a virtual apparatus. Advancing to state 406, this virtual apparatus only has a single object to click or manipulate which eliminates any distracting elements from the display and makes it easy for the user to understand what should be done.

At the completion of state 408, process 210 advances to a decision state to decide if a predetermined condition is met. In certain embodiments, the condition can be that the user manipulated the object correctly a preselected number of times. If the predetermined condition is not met, as determined at decision state 412, process 210 advances to state 412 where either the obstacle or the virtual apparatus is changed to present a new problem to the user. The user then manipulated an object in the virtual apparatus and process 210 continues at state 408. If the predetermined condition is met, as determined at decision state 412, process 210 returns at a state 414 where it is deemed that the user understands the goals taught by process 210.

Therefore, after the penguin walks across the screen, a new problem is presented. If the user doesn't click on the object, the penguin doesn't do anything. The reward is that the penguin walked across the screen, and a new puzzle is presented. The students want to see something new, and don't want to be stuck seeing the same screen of static objects in an impoverished environment. So they quickly become motivated to want to click on the appropriate spot to remove the obstacle and have the penguin "move on".

After a sufficient number of puzzles of this type, process 210 increases the difficulty at state 412. Process 210 can add two objects that can be clicked on. Clicking on one of them (the "correct" one) will remove the obstacle, and clicking on the "wrong" one will be unsuccessful in removing the obstacle. The "wrong" clickable object is different from before where there wasn't any other clickable object at all. Clicking the "wrong" object will cause the virtual apparatus to start "working", but it will fail to remove the obstacle (fail to make the path passable). In other words, process 210 shows why the object was the "wrong" thing to click on. Process 210 steadily increases the difficulty appropriately, such as having one clickable item to having two clickable items. Subsequently, process 210 could add more clickable items (where some are right and some are wrong). In one embodiment, process 210 could also make it so that the user has to click on a sequence of items, and only a correct sequence will "work".

A simple example of the first two levels of difficulty is as follows:

Easy puzzle: JiJi is standing on the left side of the screen facing to the right. The ground on which JiJi stands has a hole in it. The hole is the shape of a rectangle. Hovering above the ground is a clickable object in the shape of a rectangle. If the user clicks on the clickable object, the object transitions to the hole and fills the ground so that the path is smooth. After this, JiJi walks across the now passable path. JiJi walks off the right side of the screen, and a new puzzle is presented. The next time, the puzzle can have a hole in the ground in the shape of a triangle, and the clickable object can be an appropriately shaped triangle to fill the hole.

Harder puzzle: A harder puzzle can be if the hole in the ground is a half-circle, and there are two clickable objects hovering in the sky. One object is an appropriately shaped half-circle (the "right" object), and the second is a rectangle. Clicking on the rectangle causes the rectangle to transition over to the hole in the ground and attempt to fill it. Because the object is the wrong shape, it will not fill the hole appropriately. It might not fill up all the way to the surface of the walkway, or maybe it fills too much and creates a bump in the ground. Regardless of the type of the incorrect fill attempt, after process 210 attempts to fill the hole, JiJi walks over to the hole, turns and faces the user (indicating that JiJi doesn't feel comfortable trying to pass the unsmooth path), and then JiJi turns to the left and walks back to where JiJi started. The user sees that this didn't get JiJi on to the next puzzle. The user is given the same puzzle again. If the user clicks on the half-circle object, then the hole is filled appropriately, and JiJi is able to walk all the way across the screen and get to the next puzzle.

The examples above of executing process 210 show how the system teaches the logically consistent goals. In certain embodiments, the goal is the get JiJi past the obstacle and on to the next problem. The condition to obtain this goal is to make the path passable. The way the user obtains this goal is by a sequence of clicks on the appropriate parts of the screen. Process 210 teaches this by starting off with very simple games as described above. Once the student understands this goal and the way to obtain this goal, the system 10 can then start teaching the subject matter, e.g., mathematics. The system does so by creating problems with the same goal (removing the obstacle so JiJi can get across the screen). In order for the user to determine the correct sequence of clicks, the user must understand the underlying mathematics that the game is trying to teach. This leads to process 220, described below.

Figure 5:
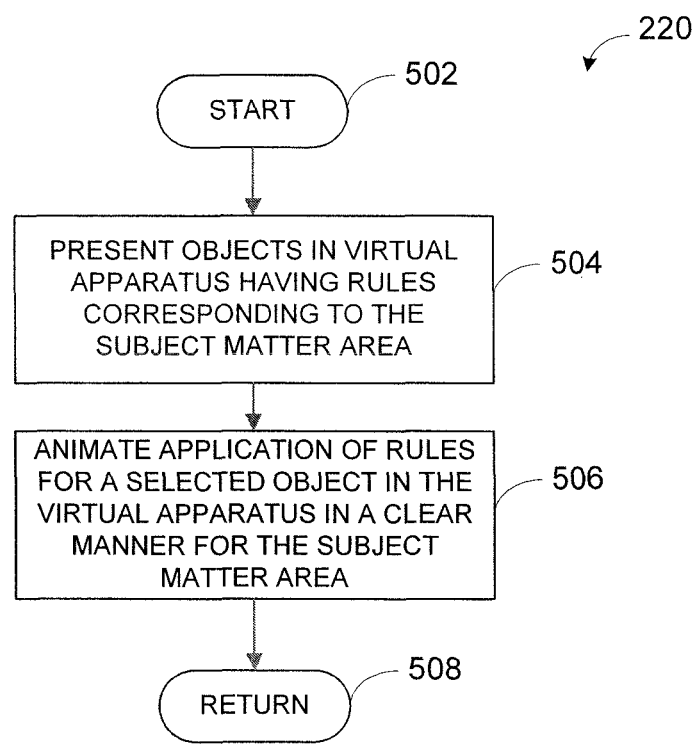
FIG. 5 is an exemplary flowchart of the process 220 shown in FIG. 2A.

Referring to FIG. 5, the process 220 previously shown in FIG. 2A will be described. Process 220 is used by system 10 to model rules and properties for a subject area by the virtual apparatus. In certain embodiments, the subject area is an area of mathematics. For example, "addition of integers" could be a subject area. Other examples of subject areas include: subtraction, fractions, multiplication, perimeter, graphing, and so forth.

Beginning at a start state 502, process 220 moves to state 504 to present objects in a virtual apparatus having rules corresponding to a subject matter area. The system 10 attempts to teach the subject area by modeling the subject area with a virtual apparatus. A virtual apparatus is a graphical entity presented on the computer screen that reacts to a sequence of user mouse clicks or other way of selecting or manipulating one or more spatial locations. In the simple example described earlier, the shape hovering in the sky is the virtual apparatus. In that case, the virtual apparatus consisted of one or more shapes. Clicking on the shape causes the shape to transition over to the hole in the ground and attempt to fill the hole. The action is what the apparatus is designed to do (the "rules").

To teach a subject area, a virtual apparatus is designed that has rules which correspond to the subject area. For example, to model addition, the system can have a virtual apparatus that has different stacks of rectangles. Clicking on a particular stack causes the planks in the stack to transition over to the holes in the ground and attempt to fill them. At state 506, process 220 animates application of rules for a selected object in the virtual apparatus in a clear manner appropriate for the subject matter area. For example, to make the user do an addition problem, the arena can have two holes. One of the holes is three planks deep, and the other hole is two planks deep. If the user clicks on a stack that has only four planks, then the planks will transition over to the first hole, and successfully fill up the three planks worth deep hole. Then the remaining plank will move over to the second hole and attempt to fill it. Unfortunately, the second hole requires two planks, but there is only one left. As a result, the second hole is not filled perfectly, and JiJi is not able to cross. In this case, the user needs to click on a stack of five planks to successfully solve the puzzle. At the completion of state 506, process 220 advances to a return state 508.

The above example illustrates a simple way to model addition with a virtual apparatus. The system 10 can model all of mathematics in this way. Several game designs for mathematics are included in the appendices.

A feature of the system is that the workings of the virtual apparatus should be visually "clear" to the user as to what the virtual apparatus does. An example of an "unclear" virtual apparatus for the addition example above is as follows:

The user clicks on a stack of planks, and the stack of planks disappear, and then reappear positioned in the holes in the ground.

The more "clear" way for the virtual apparatus to work is as follows:

The user clicks on a stack of planks and the stack visually transitions (not too quickly) over to the first hole in a continuous fashion (not a single large jump, but a sequence of movements). Once the stack of planks arrives, the stack stops, and then one by one, the planks at the bottom of the stack move to fill the first hole. After the first hole is filled, the stack transitions over to the next hole and again, one by one, the planks move into the hole.

Figure 6:
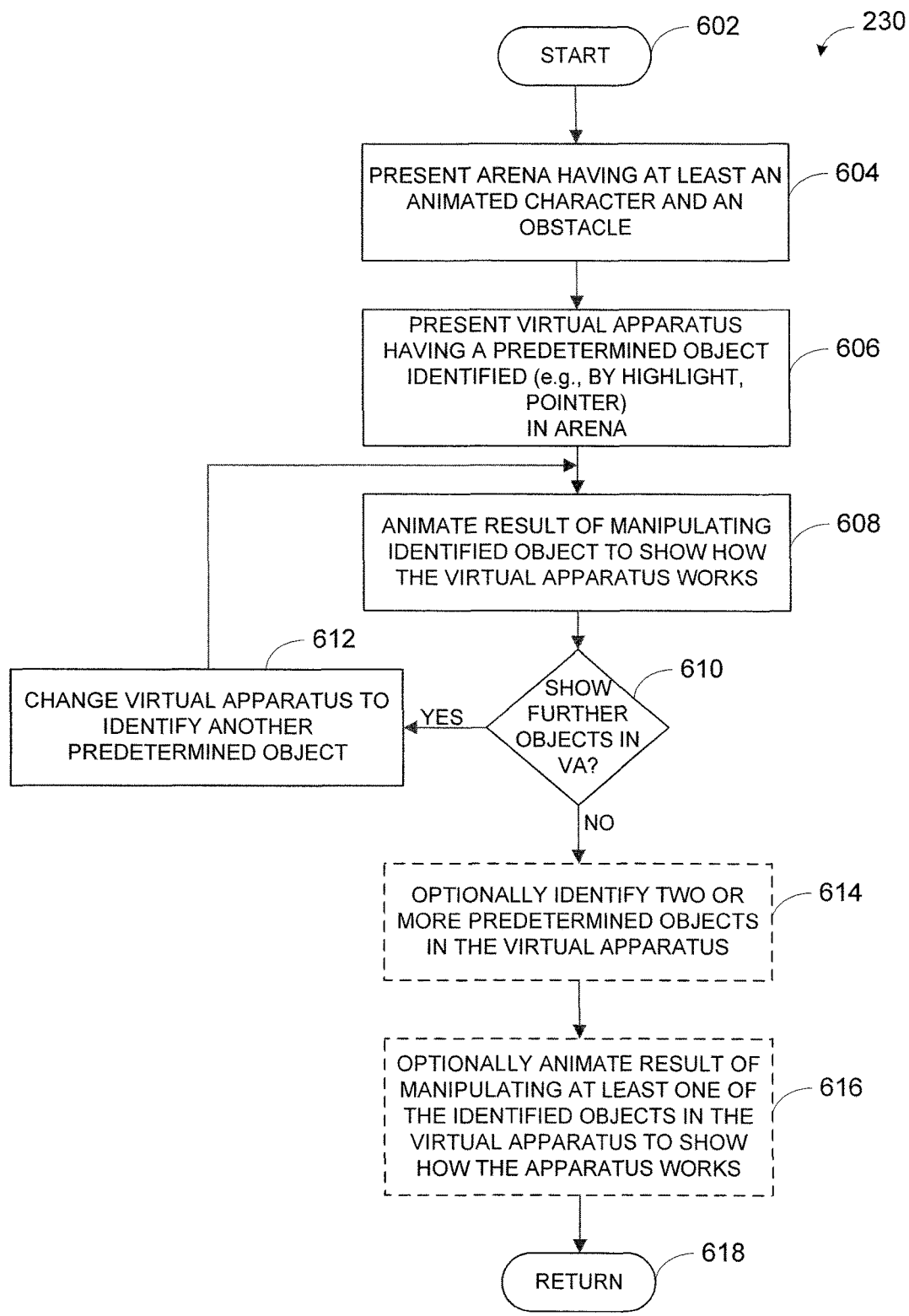
FIG. 6 is an exemplary flowchart of the process 230 shown in FIG. 2A.

Referring to FIG. 6, the process 230 previously shown in FIG. 2A will be described. Process 230 is used by system 10 to teach a user to operate the virtual apparatus. The user knows as a result of process 210 above that they need to remove the obstacle to allow JiJi to pass. They also know that they need to operate the virtual apparatus successfully. In order to operate the apparatus successfully, they need to learn how this particular virtual apparatus works. The system 10 teaches the user using similar acts as described above for process 210.

Beginning at a start state 602, process 230 proceeds to state 604 and presents to the user an arena having at least an animated character and an obstacle. Advancing to state 606, process 230 presents to the user a virtual apparatus having a predetermined object identified in the arena, such as by highlighting or using a pointer to identify the object. If the subject matter area is sophisticated, the virtual apparatus typically has multiple clickable regions, and can require a particular sequence of clicks to make it do the appropriate thing to remove the obstacle. If the user starts clicking randomly in the arena, it could take a long time for the user to figure out how the virtual apparatus works. Therefore, the system presents an appropriately simple problem to the user. Then, in certain embodiments, process 230 masks out all of the clickable regions of the virtual apparatus except for a first region (such as in a sequence of regions) that the user must click on in order to solve the problem. Then process 230 points out this region to the user. One way that process 230 points out the region is by highlighting it using a bright color so the user sees it clearly. Another technique is to place a hand cursor over the object to prompt the user to click on the object. Proceeding to state 608, process 230 animates the result of manipulating the identified object to show how the virtual apparatus works. Moving to a decision state 610, process 230 determines if further objects in the virtual apparatus are to be identified to the user, such as, for example if a sequence of manipulations of objects is required to make the virtual apparatus work. If further objects are to be identified, as determined at decision state 610, process 230 advances to state 612 to change the virtual apparatus to identify another predetermined object, and then shows how the virtual apparatus works at state 608, previously described. For example, process 230 can mask out all of the clickable regions except for a second region (in a sequence) that the user must click on. In essence, the system guides the user through a problem, showing the user what to click on and making it so they can only get it right by identifying the appropriate region as the only clickable region at the time. In certain embodiments, after the system guides the user through the sequence, the virtual apparatus does its function (through animation) and the user observes how it works.

After this animation, process 230 can determine that no further objects are to be identified, as determined at decision state 610. If so, process 230 can advance to optional state 614 to identify two or more predetermined objects in the virtual apparatus at the same time. For example, the system can present another problem, and unmask more clickable areas so the user has to decide on their own what to click on. The system can gradually increase the difficulty so that the user has a chance to get a feel for how to operate the virtual apparatus. Proceeding to optional state 616, process 230 animates the result of manipulating at least one of the identified objects in the virtual apparatus to show how the apparatus works. Eventually, the user knows how the apparatus works, and then must use it to solve the problems related to the subject area. Since the rules of the virtual apparatus are related to the rules of the subject area, just learning how to operate the virtual apparatus is progress towards learning the subject area.

Figure 7:
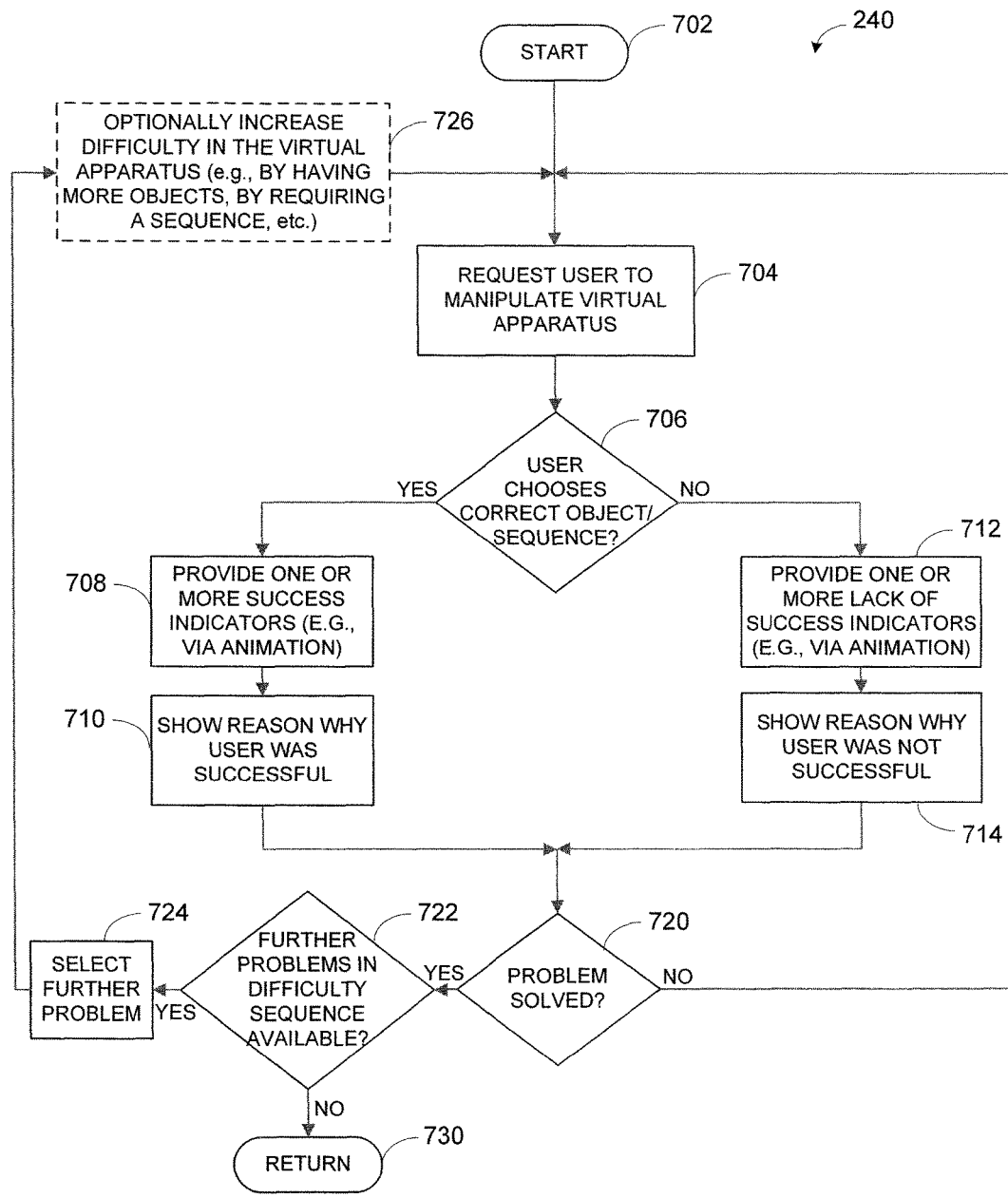
FIG. 7 is an exemplary flowchart of the process 240 shown in FIG. 2A.

Referring to FIG. 7, the process 240 previously shown in FIG. 2A will be described. Process 240 is used by system 10 to request students to operate the virtual apparatus to solve increasingly difficult problems. Thus, further progress is made by asking the user to operate the virtual apparatus successfully to solve new and more sophisticated problems. For example, the rules of addition are the same for small numbers and large numbers. Once the user knows how addition works, there is still a lot of learning to be done to be come adept at solving addition problems of increasing difficulty.

Beginning at a start state 702, process 240 moves to state 704 to request the user to manipulate the virtual apparatus. Proceeding to a decision state 706, process 240 determines if the user chose the correct object(s) or sequence of objects. If so, process 240 advances to state 708 to provide one or more success indicators to the user, such as via animation. Continuing at state 710, process 240 shows the user reasons why the chosen objects caused success in the problem. The appendices provide examples of states 708 and 710 for various problems. Returning to decision state 706, if the user did not choose the correct object(s) or sequence of objects, process 240 proceeds to state 712 to provide one or more lack of success indicators, such as via animation. Continuing at state 714, process 240 shows the user reasons why the chosen objects caused the lack of success in the problem.

At the completion of either state 710 or 714, process 240 checks if the problem was solved correctly. If not, process 240 continues at state 704 to request the user to manipulate the virtual apparatus as described above. In certain embodiments, the user is asked to repeat the same problem. In other embodiments, the user is asked to solve a new problem similar to the problem that was incorrectly solved. However, if the problem is correctly solved, as determined at decision state 720, process 240 advances to a decision state 722 to determine if a further problem in a sequence of problems having progressive difficulty are available. If so, process 240 continues at state 724 by selecting a new problem for the user. Proceeding to an optional state 726, process 240 can increase the difficulty in the virtual apparatus to make the problem more challenging for the user, such as, for example, by having more objects, by requiring a certain sequence of objects to be selected, and so forth. Process then continues at state 704 to request the user to manipulate the virtual apparatus, as described above. Returning to decision state 722, if a further problem in a sequence of problems having progressive difficulty is not available, such as due to all the problems being executed, process 240 moves to a return state 730.

CONCLUSION

While specific blocks, sections, devices, functions and modules may have been set forth above, a skilled technologist will realize that there are many ways to partition the system, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

APPENDIX A

Example 1-1

Puzzle Title: Slime Bridge

Overview: SlimeBridge teaches ratios.

Objective: Determine the path with the desired ratio of slime to food. If the ratio is correct, the slime eats the food and grows into a bridge so that JiJi can walk across and get off of an island.

Arena Layout:

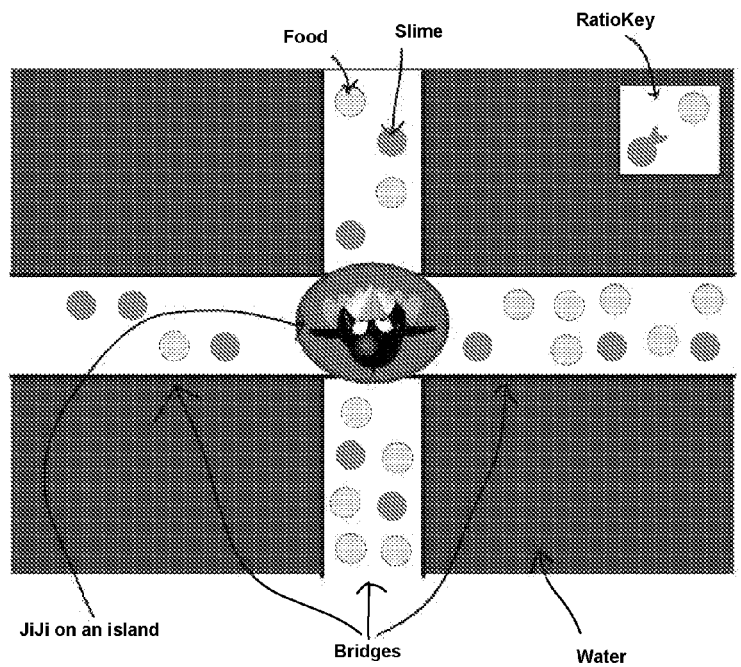

Figure 1:
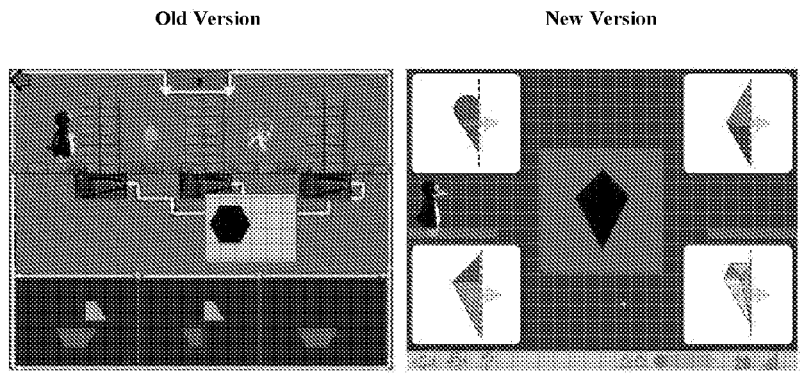

Figure 1: Example Layout

This arena 23 uses a view from above. JiJi begins on a green island in the middle of the screen. Impassable bridges are to the north, south, east and west Bridges get filled in by slime. The student 16 selects the bridge with the correct ratio of slime to food. The required ratio appears in a RatioKey at the top right corner of the scene. As shown in Figure 1, the required ratio is 1:1 (one slime for every one piece of food). In this example, only the bridge going North has the correct ratio (2 slimes and 2 foods). Clicking on that bridge will make the slime eat the food and grow into a walkway so JiJi can walk across. Filling the bridge and JiJi walking across are success indicators. An impassable bridge is a lack of success indicator.

Figure 2:
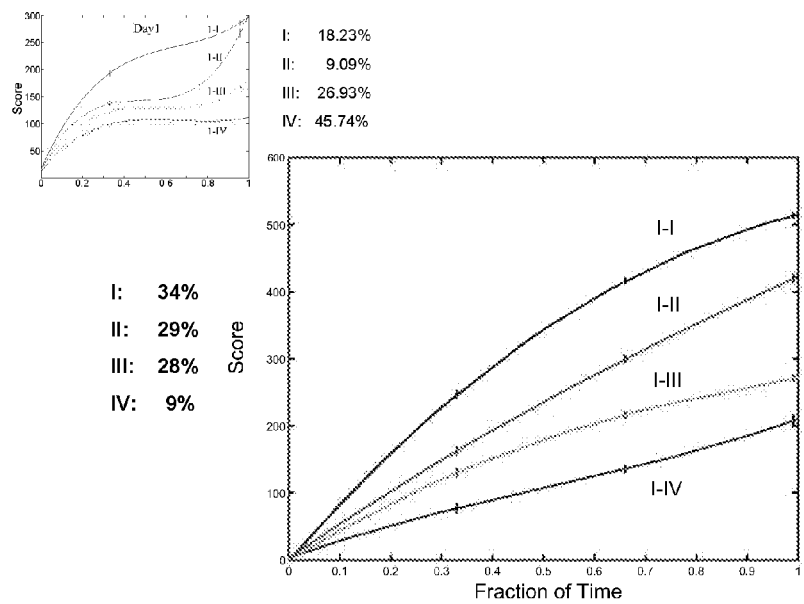

Bridges: The game has 4 bridges which serve as choice buttons. Clicking on a bridge activates the slime to eat the food. The bridges on the left and right of the island are longer than the bridges that point up and down. For this reason the left and right bridges can hold more slime. Each bridge holds multiple SlimeUnits. The top and bottom bridges hold 2 SlimeUnits, and the left and right bridges hold 3 SlimeUnits. Figure 2 shows how the SlimeUnits (shown in black) are arranged on each bridge.

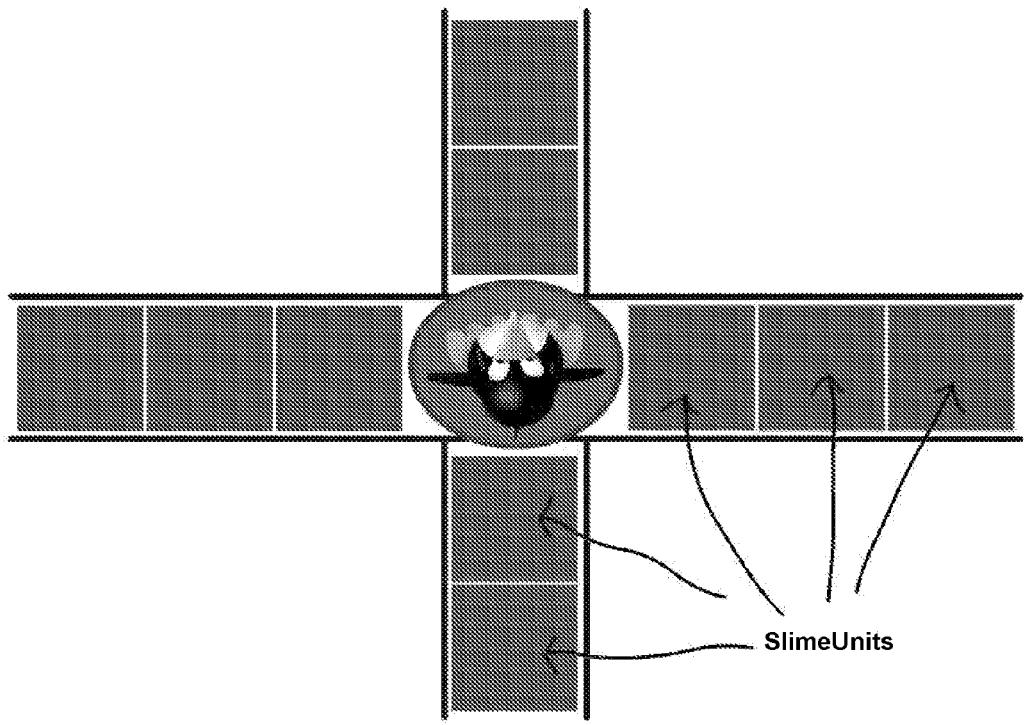

Figure 2: Positioning of SlimeUnits

Each SlimeUnit is set to a "SlimeUnit MovieClip" as specified by the PuzzleDef.

SlimeUnits: SlimeUnits are MovieClips that contain slime and food in an 80x80 square. The first frame is a solid colored square. The second frame contains slime and food positioned within the 80x80 space. Frames 2 – 7 contain an animated sequence of the slime eating the food. An example SlimeUnit MovieClip is shown in Figure 3.

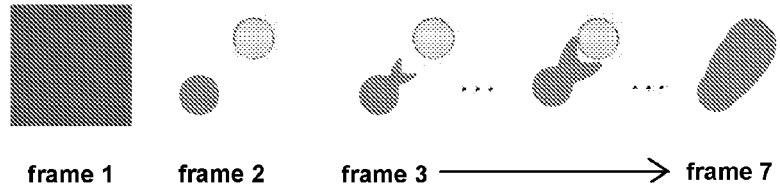

frame 1    frame 2    frame 3 ——————————→ frame 7

Figure 3: Example of a SlimeUnit MovieClip.

Two main types of SlimeUnit movieClips exist. A "correct" SlimeUnit contains slime and food in the correct ratio. An "incorrect" one has either too many slimes or too much food. Correct SlimeUnit MovieClips have the following naming convention:

S + RatioKey + "Correct_" + #Slime + Index# + letter

For example, if the RatioKey is a 1:1 ratio (denoted as "11"), the SlimeUnit MovieClip might have the following name: "S11Correct_11a"

The "11" after the "Correct_" means that there is 1 slime and 1 food. The "a" at the end is simply to distinguish this MovieClip from other versions of the same configuration. Other versions would have a "b", "c" or other letter after the name.

There can be multiple versions of "Correct" MovieClips for each RatioKey. For example, all of the following are all "correct" SlimeUnit MovieClips for a 1:1 ratio: "S11Correct_11a", "S11Correct_11b", "S11Correct_22a".....

Some "correct" SlimeUnit MovieClips for a 1:2 ratio could be named: "S12Correct_12a", "S12Correct_24a", "S12Correct_12b"......

Incorrect SlimeUnit MovieClips have "Incorrect_" instead of "Correct_" in their name. For example, if there is one extra piece of food for a 1:1 RatioKey, then the name might be: "S11Incorrect_12a"

Plainly there is one too many pieces of food because after the "Incorrect_" there is the number "12" which means one slime and two foods. But this is a "S11" SlimeUnit, which means it should have a 1:1 ration to be correct. What this incorrect SlimeUnit might look like appears in Figure 4.

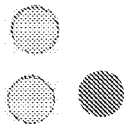

Figure 4: Example of an incorrect SlimeUnit (for a 1:1 RatioKey)

The names of the SlimeUnit MovieClips allow one to determine if a bridge has a correct or incorrect ratio. This is determined by making sure each and every SlimeUnit in the bridge is a "Correct" MovieClip. For example, if the bridge has the following SlimeUnits:

"S11Correct_11a", "S11Correct_11b", "S11Incorrect_13a"

then this is an incorrect bridge because the last SlimeUnit is not a "correct" MovieClip (it has two extra pieces of food). If the bridge has the following SlimeUnits:

"S11Correct_11a", "S11Correct_00a", "S11Correct_22b"

then this is a "correct" bridge because each SlimeUnit has "Correct_" in the name.

RatioKeys: In one embodiment, three RatioKeys exist in the SlimeBridge game:

1:1, 1:2 and 1:3.

The RatioKey is represented graphically at the top-right corner of the arena (see Figure 1 for an example). The three RatioKeys are shown in Figure 5. The top of Figure 5 illustrates the graphical versions, and at the bottom are the numerical versions. The version used depends on the "language" attribute in the Puzzle Definition.

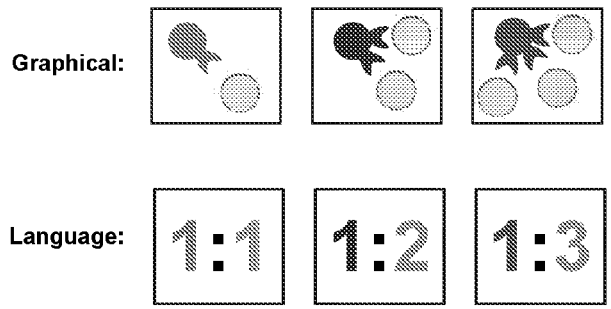

Figure 5: The different RatioKeys

Note that the different ratios have slimes of different color (1:1 has green slimes, 1:2 has dark-red slimes, 1:3 has magenta slimes).

Interactivity:

Clicking On a Bridge: The bridges are the answer buttons that the user clicks on to solve the puzzle. After clicking on a bridge, the following sequence of events occurs:

1) All the SlimeUnit MovieClips on the three other bridges (the bridges not clicked) become invisible.

2) JiJi turns and looks in the direction of the clicked bridge.
3) All the SlimeUnit MovieClips on the clicked bridge play frames 3 thru 7.
4) If all the SlimeUnits on the clicked bridge are "correct", then the bridge empty space in the bridge fills in (over a 3-frame animation) to become a solid color (same color as the slime). However, if one of the SlimeUnits is not correct, then the inside of the bridge stays white, and a puzzleOver is sent with the "success" parameter set to false.
5) If the "correct" bridge was clicked, then JiJi walks across the colored bridge and off the screen. After this the puzzleOver message is sent with "success" true.

Puzzle Definition: There is an example puzzle definition XMLNode for SlimeBridge:

```
<def          ratioKey='11'          slimeUnits0='S11Correct_11a,S11Correct_11a'
     slimeUnits1='S11Incorrect_10a,S11Correct_00a,S11Correct_11a'
     slimeUnits2='S11Correct_11a,S11Incorrect_12a'
     slimeUnits3='S11Correct11a,S11Incorrect_12a,S11Incorrect_12a' rotations0='0,1'
     rotations1='2,1,3' rotations2='0,0' rotations3='3,3,2' language='0,0'/>
```

Description of each attribute:

ratioKey: This describes the number of slimes to the number of food. In one embodiment, the possible values are '11', '12, and '13' which mean ratios "1:1", "1:2", and "1:3".

slimeUnits0—slimeUnits3: These 4 attributes correspond to the 4 bridges. They specify the names of the MovieClips to place at each SlimeUnit position in each bridge. The top bridge is bridge 0, the right one is 1, the bottom is 2 and the left bridge is 3. As you can see slimeUnits0 and slimeUnits2 only have 2 items in their lists. This is because the top and bottom bridges only hold two SlimeUnits.

rotations0—rotations3: These 4 attributes correspond with the 4 bridges. Each attribute is a list of numbers that specify the rotation state of each SlimeUnit MovieClip. The accepted values are 0, 1, 2 and 3 which refer to 0, 90, 180 and 270 degrees rotation. Rotation is used to make the same SlimeUnit MovieClip appear to be different, as illustrated for one bridge in Figure 6.

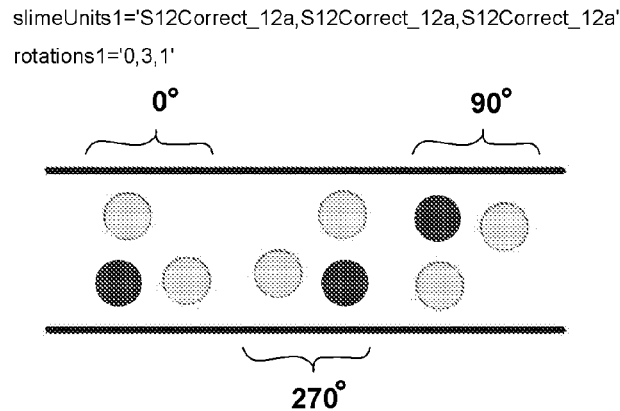

Figure 6: Example bridge and explanation of the rotations attribute

Figure 6 shows a right-facing bridge (bridge 1) with all the same SlimeUnits ("S12Correct_12a"), but with different rotations for each (in this case 0, 3 and 1).

language: This is a list of 2 Boolean values that specify if parts of the arena should be represented as language. The first value specifies if the RatioKey should be displayed as the language representation or the graphical representation (see Figure 5).

The second value determines if the bridges are displayed using language based or not. When the bridges are displayed as language, all of the slimes and all of the food should be added up and displayed as a ratio. If the bridge has the following attributes:

slimeUnits0='S11Correct_11a, S11Incorrect_12a'

Then this bridge might look like that shown in Figure 7.

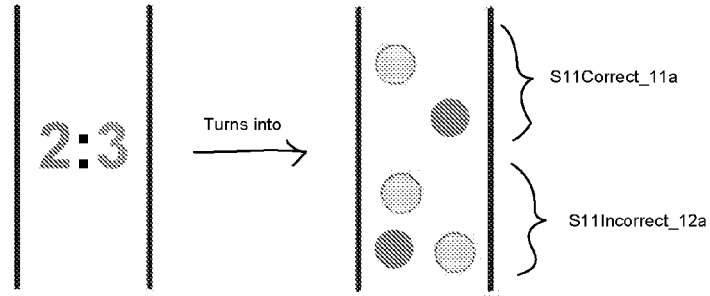

Figure 7: Example language representation of bridge

Figure 7 shows the language version on the left and the standard graphical version on the right. After the user selects a language version of a bridge, it turns into the graphical version, and then animates as normal. The example in Figure 7 is a 2:3 ratio because there are 2 slimes total and 3 foods total. The amount of slime and the amount of food in each SlimeUnit can be determined by the name of the MovieClip. All SlimeUnit MovieClips end with two numbers and a letter. The two numbers represent the number of slimes and the number of pieces of food.

In one embodiment, the colors of the first number on the language representation of a bridge should match the color of the slime for the current RatioKey.

Error Checking: When building a puzzle based on a puzzle definition, complete an error checking procedure to determine that the puzzle is valid. If a puzzle has errors in it, the one should pass false for the success parameter in the finishedConstructing call.

Parameters and Settings:

ClickStream: The following user events should be registered by calling recordClick() on the GameLogic subclass:

Click on a bridge: recordClick( "mClick", "bridge#")

--For example, when clicking on the right-side bridge it should call:
recordClick("mClick", "bridge1")

Lives and Scoring: Lives and scoring is handled by the GameViewer for this game.

Components: No special components (besides the GameLogic subclass) are required.

External Assets: None, sounds are stored in the Flash file.

APPENDIX B

Example 1-2

Puzzle Title: Wedge

Overview: Wedge teaches about the different types angles: acute angles, obtuse angles, right angles. In addition, angular relationships are taught such as supplementary and complementary angle pairs. The game also gives practice representing angles by numerical degrees.

Objective: Remove an obstacle from JiJi's path by selecting a "wedge" of the appropriate angle. The wedge removes the obstacle by wedging underneath and pushing the obstacle up, or by wedging from above and pushing something down, or through various other situations.

Arena Layout:

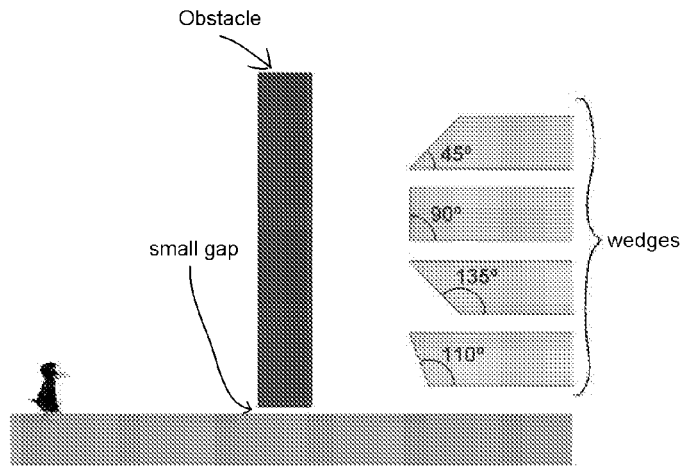

Figure 1: Example of "Acute" layout

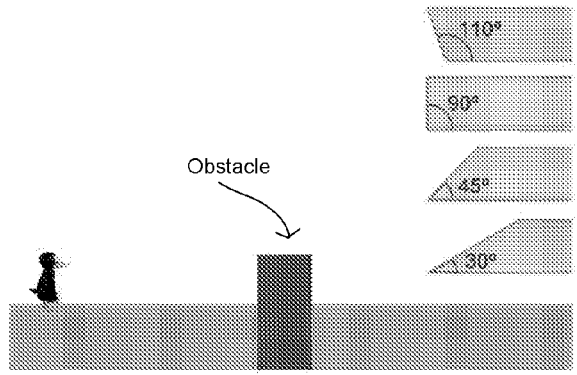

Figure 2: Example of "Obtuse" layout

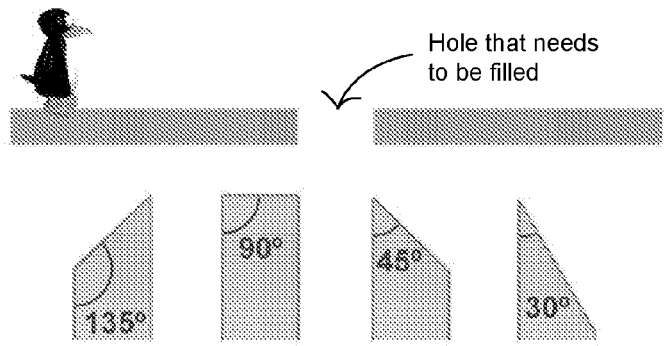
Figure 3: Example of "Right" layout
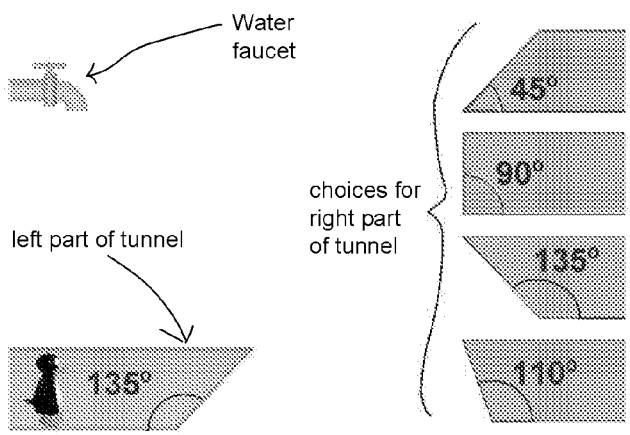
Figure 4: Example of "Supplement" layout
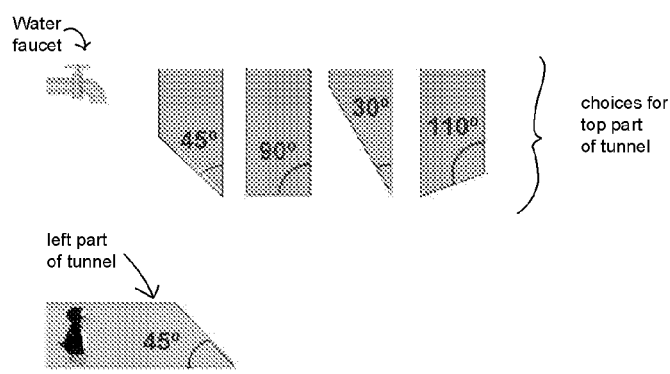
Figure 5: Example of "Complement" layout

The wedge game has 5 arena layouts: Acute, Obtuse, Right, Supplement, and Complement. Each layout is illustrated in Figures 1-5. Each layout requires choosing different types of angles:

Acute layout: Select an acute angle (<90°) to lift the obstacle so JiJi can pass.

Obtuse layout: Select an obtuse angle (>90°) to push the obstacle down into the ground.

Right layout: Select a right angle (90°) to perfectly fill the hole in the ground.

Supplement layout: Select a "supplementary" angle so that both angles on two sides of a tunnel sum to 180°. If both sides of the tunnel don't form a perfect seal, water will leak in.

Complement layout: Select a "complementary" so that both angles sum to 90°. This is similar to the Supplement layout, but the tunnel is bent at a right angle so to form a perfect seal, the two sides need to have angles that sum to 90°.

Interactivity:

Wedges pushing on obstacles: The first two layout types have wedges pushing against obstacles. Here are the different situations:

6) An acute angle pushes on an obstacle hanging from above: In this case, the wedge pushes the obstacle upwards. This is shown in Figure 6.

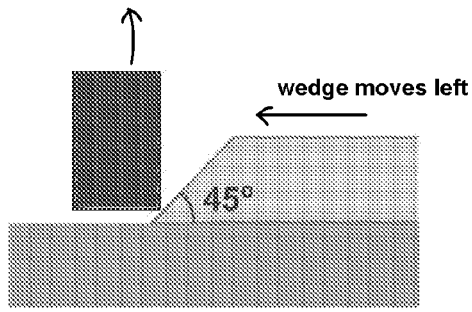

Figure 6: Pushing an obstacle up.

7) Any angle $\geq 90°$ will not be able to push a hanging obstacle upwards, so the wedge would simply hit against the obstacle and not move it at all.
8) An obtuse angle pushing on an obstacle coming out of the ground will push it into the ground. This is shown in Figure 7.

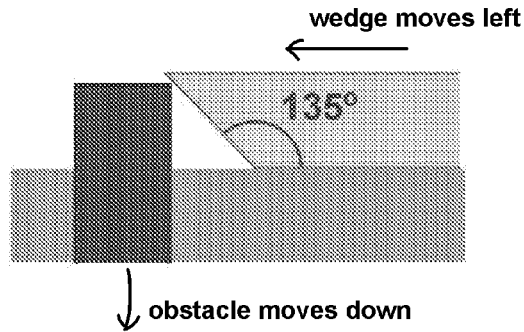

Figure 7: Pushing an obstacle down.

9) Any angle ≤ 90° will not be able to push an obstacle into the ground, so the wedge would simply hit against the obstacle and not move it at all.
10) For the "Right" layout (Figure 3), only a 90° wedge will perfectly fill the hole and create a bridge for JiJi to walk across. All other angles will create an extra bump or leave a dent in the ground so that JiJi won't be able to go across.
11) In the tunnel layouts (Supplement and Complement) only an angle that adds correctly to the left-part of the tunnel will form a perfect seal and not let any water come in.

Clicking on an answer: The wedges (or tunnel pieces) are answer choices in this game. They have mouse-over states. When an answer wedge is selected by clicking on it, the other wedges should disappear. The selected wedge should then move into position and perform its operation (depending on the layout).

Water filling and tunnels: After the user makes a choice for the Supplementary and Complementary layouts, a water faucet will appear and start filling the arena with water. If a perfect seal is not created for the tunnel, then water will enter the tunnel and push JiJi out to the left of the screen. If a perfect seal is in place, then water will not enter the tunnel, and JiJi will proceed to move through the tunnel. In the "Supplement" layout, JiJi simply walks straight to the right through the tunnel and off the right edge of the screen. In the "Complement" layout, a ladder comes down from the vertical part of the tunnel so JiJi can climb up off the top of the screen.

Puzzle Definition:
There is an example puzzle definition XMLNode for Wedge:

<def layout='Acute' initialAngle='45' choices='45,90,135,110' language='0'/>

Description of each attribute:

layout: This specifies which layout to use. The accepted values are Acute, Obtuse, Right, Supplement and Complement.

initialAngle: This attribute is only required for the Supplement and Complement layouts. This defines the angle of the right-side part of the tunnel.

choices: This is a list of 4 angle values representing the 4 "wedges". These are the answer choices that the user must select from.

language: This is a single Boolean value to indicate if the answer choices should be represented by pure language or not. The language representation appears in Figure 8.

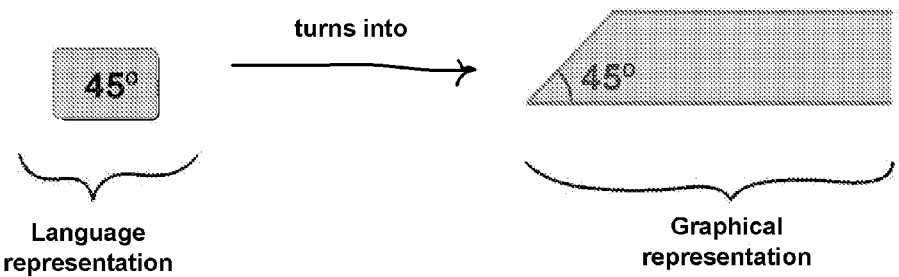

Figure 8: Illustration of language representation of a wedge.

Figure 8 shows a language representation of a wedge on the left and the graphical version on the right. The language representation is simply a button with the number of degrees as the label. Notice that the graphical version isn't "completely" graphical since it also has the numerical number of degrees indicated. When the user selects a "Language" represented wedge, it transforms into the graphical version through an animation. Wedges in all of the different layouts can be represented as language.

Parameters and Settings:

ClickStream: The following user events should be registered by calling recordClick() on the GameLogic subclass:

Click on a bridge: recordClick( "mClick", "Wedge#")

Lives and Scoring: Lives and scoring is handled by the GameViewer for this game.

Components: No special components (besides the GameLogic subclass) are required.

External Assets: None, sounds are stored in the Flash file.

Demo and graphics:

Animated Demos: Several animated demos are included.

Graphics: All the graphics needed are included in animated demonstration Macromedia Flash movie authoring (.fla) files.

APPENDIX C

Example 1-3

Title: RoundOff

Overview: RoundOff teaches how to round numbers (round up, round down and round to the nearest integer).

Objective: Choose the correct number of blocks that will move a lifter over to the right spot to lift up a wall blocking JiJi's path.

Arena Layout:

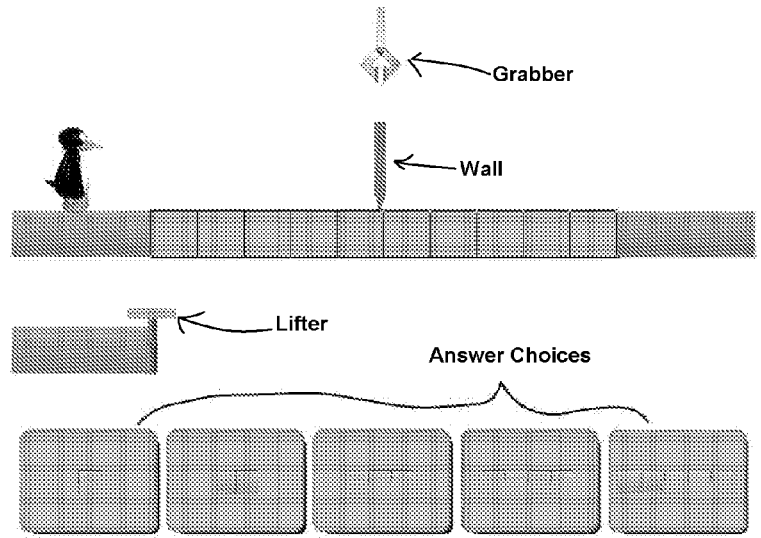

Figure 1: Example layout

The RoundOff layout consists of a grabber at the top that is directly above a wall. The wall rests on a tiled walkway. Below the walkway is an area that a Lifter operates. The lifter can push upwards, and if positioned correctly, will push up the wall. Below the Lifter area is a solution set of 5 Answer Choices. The answer choices contain different numbers of tiles. When an Answer Choice is selected, the tiles grow to full size (same size as in the walkway) and move to push the lifter over to the right.

There are 3 types of lifters. There is the brown-colored "RoundNearest" lifter. Then there is the green "RoundDown" and the red "RoundUp" lifters. These are illustrated in Figure 2. The RoundNearest lifter will push a wall up if it is within ½ of a block away (either to the left or the right). The RoundDown lifter will push a wall up if it is within 1 block to the right. The RoundDown lifter will push a wall up if it's within 1 block to the left.

When a wall is pushed up, it is clamped by the Grabber and taken off of the screen. JiJi is then able to walk off. If the Lifter misses the Wall, then JiJi remains blocked. The Lifter must push the wall upwards at the walls bottom point. If it misses the point slightly, then it might still hit the wall, but won't push it upwards.

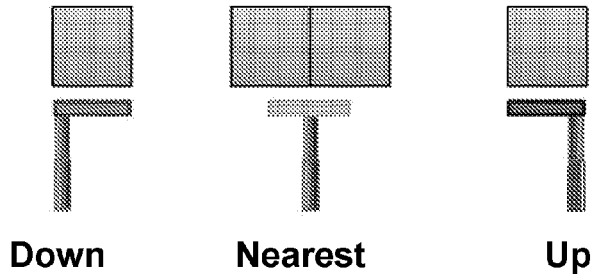

Down  Nearest  Up

Figure 2: Different types of Lifters

Interactivity:

Clicking on an Answer Choice: Clicking on an answer choice results in that choice's tiles growing to full height and moving to extend the platform that the lifter is on. The Lifter then shifts to the end of the tiles and pushes upwards.

Puzzle Definition:

There are example puzzle definitions XMLNode for RoundOff:

<def    lifterType='Nearest'    wallLoc='4.8'    choices='1,2,3,4,5'    language='0,0,0' asFraction='0'/>

Here is a description of each attribute:

lifterType: This specifies which type of Lifter to use. In one embodiment, the 3 acceptable values are:
        Down
        Nearest
        Up wallLoc: This is the location of the wall. It is typically a decimal number. A value of 4.8 means the wall's pointy bottom is pointed at 4.8 tiles over.

choices: This is a list of up to 5 choices. Fewer choices are allowed. In "Graphical representation" a maximum of 5 boxes fit within a choice. But in "Language Representation", a choice is not limited to 5 boxes.

language: This is a list of 3 Boolean values the specify which parts of the arena should be represented as language (numbers). The first value specifies the location of the wall, the second value defines the Lifter type, and the third value specifies Answer Choices. Figures 3-5 illustrate how these parts are to be represented by language.

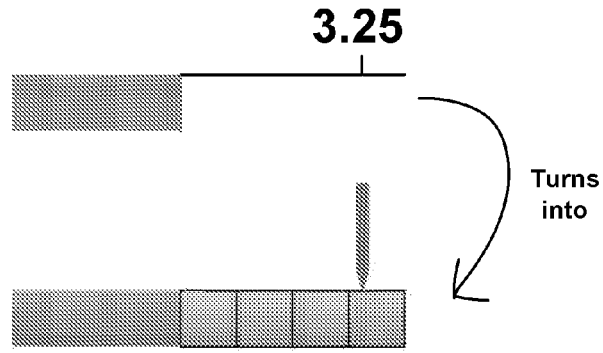

Figure 3: Language representation of Wall Location with asFraction='0'

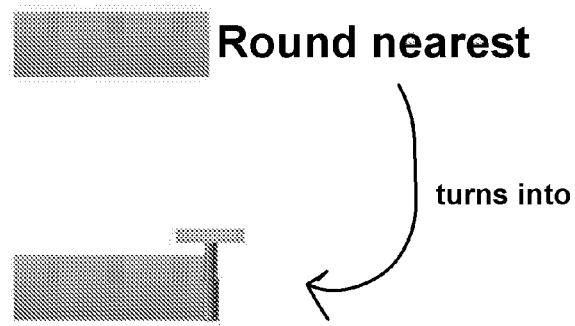

Figure 4: Language representation of Lifter

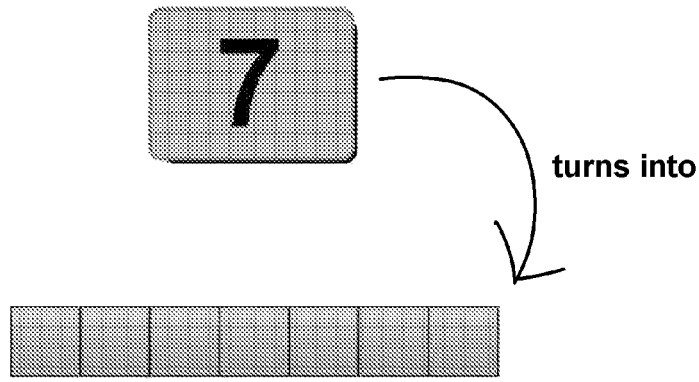

Figure 5: Language representation of Answer Choice asFraction: This is a single Boolean value that only has meaning when the Wall location is being represented by language. When "asFraction" is 1, then the Wall's location should be represented as a fraction. For example, instead of the decimal notation as shown in Figure 3, it would have a fraction notation as in Figure 6. Note that for 1/3 and 2/3, the fractions will be rounded to three decimal places (0.333 and 0.667). These should be converted to the appropriate 1/3 and 2/3 fractional forms. As another example, 0.875 would be represented as 7/8.

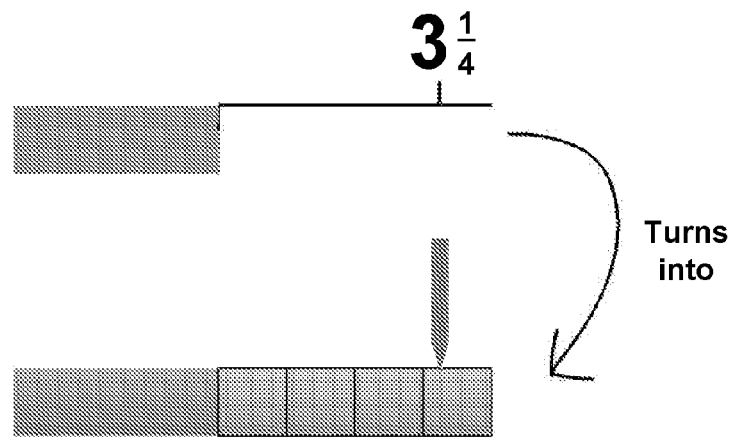

Figure 6: Language representation of Wall Location (3.25) with asFraction='1'

Parameters and Settings:

ClickStream:
    The following user events should be registered by calling recordClick() on the GameLogic subclass:

Click on an Answer Choice:

recordClick( "mClick", "Choice#")

Lives and Scoring: Lives and scoring is handled by the GameViewer.

Components: No special components (besides the GameLogic subclass) are required.

External Assets: None, sounds are stored in the Flash file.

Animated Demos: Several animated demos are included.

Graphics: All the graphics needed are included in the animated demonstration fla files.

APPENDIX D

Example 1-4

Title: FracWall

Overview:
    FracWall teaches taking fractions of whole numbers by asking how many tiles are needed to fill up a hole if the tiles are to be duplicated (or multiplied by some other number) first. The duplication (and multiplication) happens by an unfolding symmetry operation.

Objective: Determine how many tiles will fill a hole. Tiles are chosen from a wall that may undergo an unfolding operation. Tiles may also be cut into 1/2 or 1/3 on the way to the hole.

Arena Layout: The arena has 3 parts. At the bottom is a walkway where tiles are removed to form a hole that JiJi must fill in order to pass. Above is an optional cutting stage consisting of a floor with a hole containing a cutting saw. Parts of the tiles cut away are transported off the screen by a conveyor belt, and the remaining portion continues on to the hole. At the top of the arena is a wall of tiles from which individual tiles are selected by the student.

The arena also has a language representation of each piece.

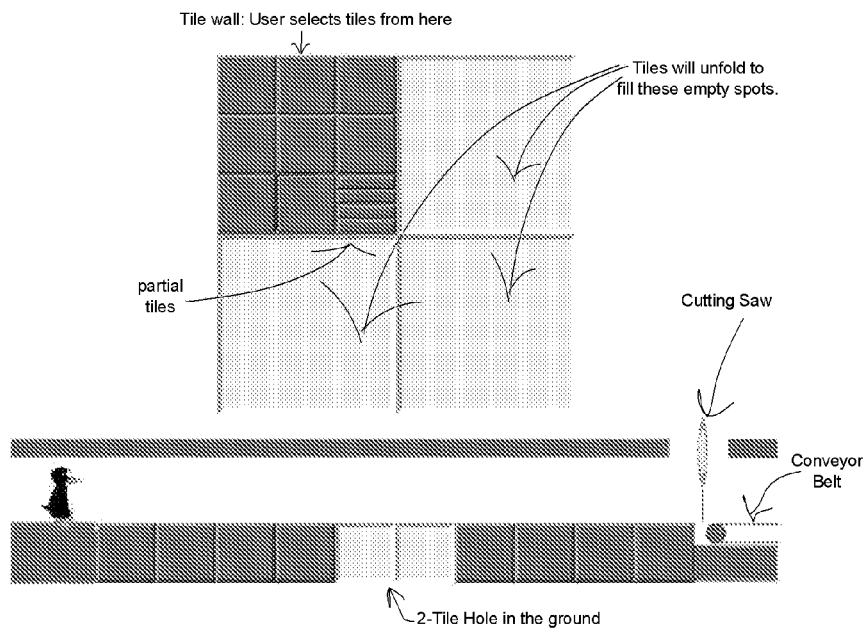

Figure 1: Example layout

Tile Wall: At the top of the arena is a Tile Wall. This consists of a tile selection region (gray tiles), and some empty spots into which the tiles will unfold. The TileWall can have zero (no unfolding), one (*2 unfolding), two (*3 unfolding) and three (*4 unfolding) empty spots. The TileWall in figure 1 shows three empty spots. In the selection area of the TileWall, 9 tiles are available to choose from (3x3 grid). The bottom-right tile is broken into N parts, where N corresponds to 1+ the number of empty spots. In other words, if the selection region is going to unfold so that there are 4 times as many tiles, then the bottom-right tile will be broken up into 4 parts. If a user selects a partial tile, it will unfold to create the equivalent of a full tile.

When the user selects a tile with the mouse (by clicking), the tile turns blue. Selecting an already-selected (blue) tile deselects it (makes it gray again).

When the user clicks on JiJi, the entire selection region of the TileWall (both blue and gray tiles) unfolds (in an animated way) into the empty spots. Blue tiles will be multiplied by the unfolding process. The blue tiles then proceed to fill in the hole. The blue tiles may have to pass through a cutting saw first on the way to the hole.

If there are not enough blue tiles, the hole in the ground will not be filled, and JiJi cannot walk across. If there is a perfect amount, then JiJi is able to walk across. If there are too many blue tiles, then they pile up, preventing JiJi from going across. This appears in Figure 2.

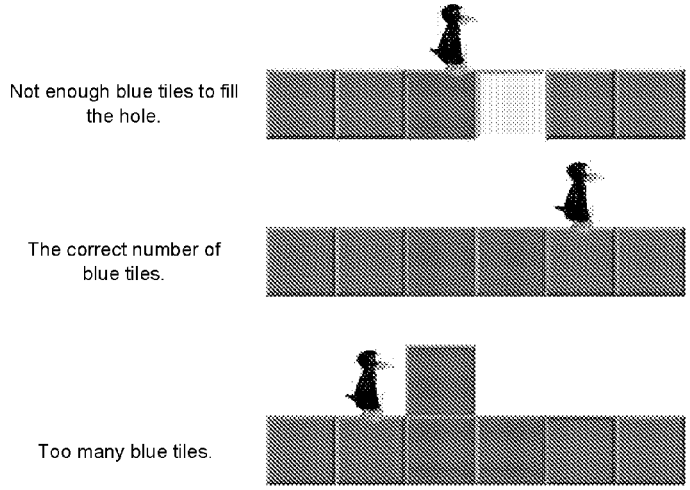

Figure 2: Filling the hole

Cutting Saw: The cuttingSaw is an optional part of the arena, whether it appears or not depends on the puzzle definition. When the cuttingSaw is not visible, then the cuttingSaw's floor and conveyor belt are also not visible. For example, the arena layout in Figure 1 has the cuttingSaw visible. If it was not visible; it would appear as shown in Figure 3.

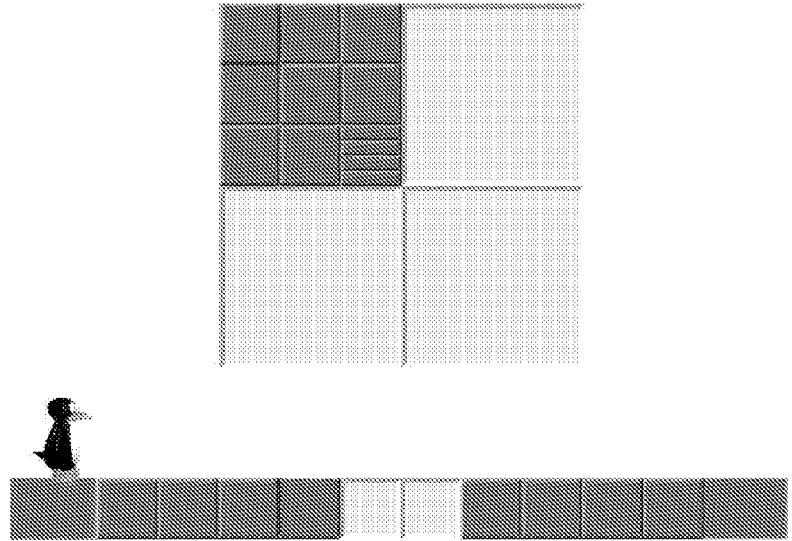

Figure 3: Arena layout without the cuttingSaw

JiJi is bigger when there is no cuttingSaw, and the right portion of the ground is the same height as the rest of the ground because there is no longer a conveyor belt.

When the cuttingSaw is visible, it comes in two types: 1/2 cutting and 1/3 cutting. The 1/2 cutting is what is shown in Figure 1. It cuts each blue tile (or partial tile) into half, and the left half moves to fill the hole in the ground, and the right half falls on the conveyor belt, and gets transported off the right side of the screen. The 1/3 cuttingSaw (shown in Figure 4), cuts each blue tile (or partial tile) into 3 equal pieces. The left 1/3 goes to the left to fill the hole while the right 2/3 falls on the conveyor belt.

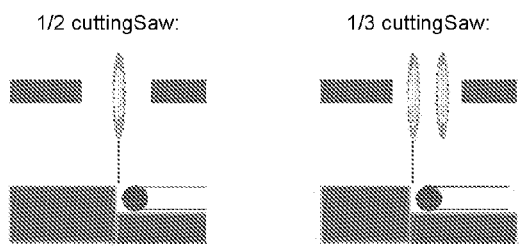

Figure 4: 1/2 and 1/3 cutting saws

Interactivity:

Selecting Tiles in the TileWall: The student's task is selecting the correct number of tiles to fill the hole. They select tiles by clicking in the selection area of the tile wall (at the top of the arena). A selected tile is blue, while a tile not selected is gray. Clicking on a tile toggles its state between blue and gray (selected and not selected).

Clicking on JiJi: Clicking on JiJi activates the unfolding process. After unfolding, the tiles move to the hole in the ground (possibly passing through a cutting saw first).

Puzzle Definition: An example puzzle definition XMLNode for FracWall:

<def multBy='4' numSaws='1' holes='2' language='0,0,0'/>

Description of each attribute:

multBy: Stands for "multiply by", and describes what type of unfolding applies. The example arena shown in Figure 1, is a *4 type of unfolding, so multBy will be 4. MultBy can be 1 (no unfolding), 2, 3 or 4. When MultBy is 1, then the TileWall consists of a 3x3 grid of whole tiles (no partial tiles) centered in the top part of the arena. If multBy is 2 or 3, then the TileWall appears as shown in Figure 5.

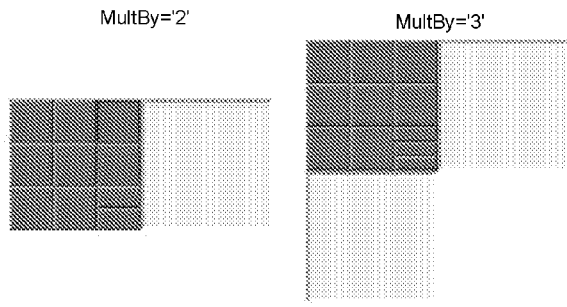

Figure 5: TileWall when multBy is 2 and 3 numSaws: This is the number of saws in the CuttingSaw. The optional values are 0 (no cuttingSaw), 1 (cutting in half) and 2 (cutting in 1/3). These different numSaws are illustrated in Figures 3 and 4.

holes: This is the number of holes to be filled.

language: This is a list of three Boolean values indicating if the parts of the arena should be represented by language or not. The first value is for the TileWall, the second is for the CuttingSaw, and the third value is for the holes in the ground. If language='0,1,0', this means that the CuttingSaw should be represented by language but the other parts should be represented pictorially. The figures above all show pictorial representations (language='0,0,0'). The following is a description of how the language representation works.

1) Language representation of the TileWall:

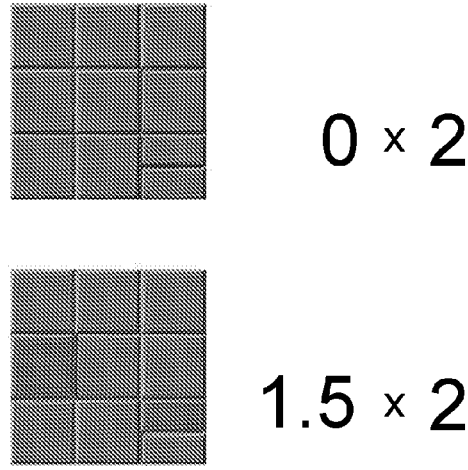

Figure 6: Language representation of TileWall.

Here the number of tiles selected by the user is shown numerically on the right. The type of unfolding is shown by a multiplication sign followed by the multBy value. After JiJi is selected, the numbers go away, and the tiles unfold as normal.

2) Language representation of the CuttingSaw:

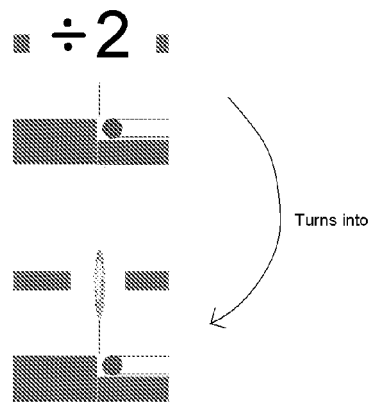

Figure 7: Language representation of CuttingSaw.

Here the saw starts of with a division sign and a number representing what the saw is going to do. Figure 7 at the top shows a "divided by 2". When JiJi is clicked, this turns into a saw as shown at the bottom of Figure 7. The saw then functions as normal.

3) Language representation of holes in the ground:

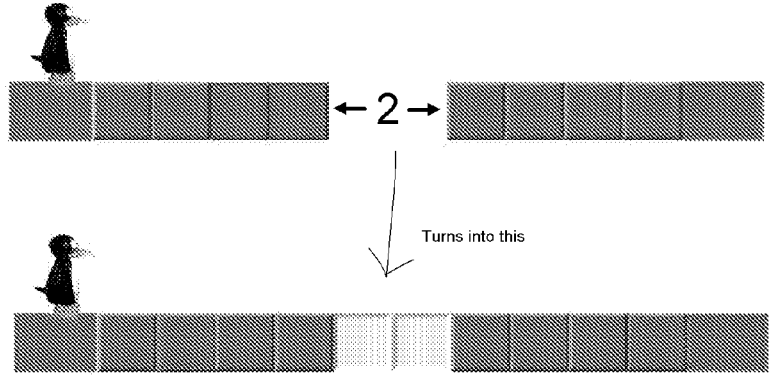

Figure 8: Language representation of holes in the ground.

Here the holes start out just a space represented by a number with arrows showing that the number represents the width of the hole. When JiJi is clicked, the number turns into the corresponding number of holes in the ground. The holes in the ground then function as normal.

Parameters and Settings:
    The following are arena parameters that should be settable after the arena is compiled (generating a Macromedia Shockwave Flash (.swf) file format file):

unfoldSpeed: This is the speed that TileWall unfolds
    tileMoveSpeed: This is the speed that the tiles move.

ClickStream:
    The following user events should be registered by calling recordClick() on the GameLogic subclass:

Pond Location:
        recordClick( "mClick", "tileLocation#")

Lives and Scoring:
    Lives and scoring is handled by the GameViewer for this game.

Components:
>No special components (besides the GameLogic subclass) are needed. If feasible, the unfolding controllers can be made into reusable components.

External Assets: The sound effects should be dynamically loaded from the Assets/sound folder.

Special Considerations:

Demo and graphics:

>Animated Demos: Several animated demos are included.

>Graphics: All the graphics needed are included in the animated demo fla files.

>Sound effects: Sounds should be kept external to the arena.swf file and should be dynamically loaded from the Assets/sounds folder.

APPENDIX E

Example 1-5

Title: Estimation Bridge

Overview: Estimation bridge exercises both spatial and temporal estimating.

Objective: Fill a hole by either picking the right length plank, or stopping a moving plank at the right time.

Arena Layout: This game has two arenas: SpatialEstimation and TemporalEstimation.

SpatialEstimation Arena:

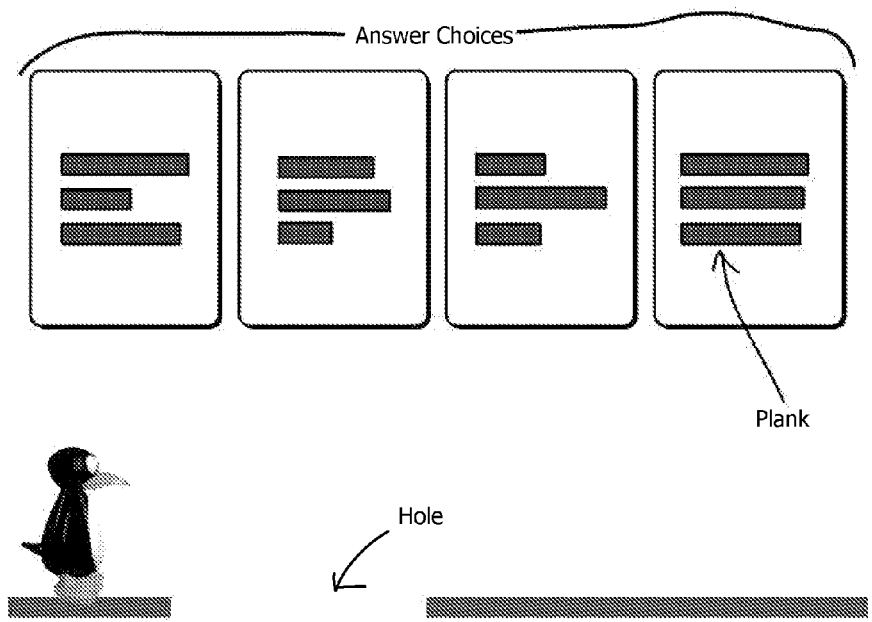

Figure 1: Example layout for SpatialEstimation

In the SpatialEstimation arena, four answer choices are at the top, each answer choice has one or more blue planks (left justified). At the bottom is a walkway with a hole in it. The goal is to pick the answer choice, select solution set member that has planks that sum to the same length as the hole. The correct choice fills the hole perfectly. If the planks add up to too much, then they cannot all fit in the hole. If the planks add up to too little, then a hole remains. These situations appear in Figure 2.

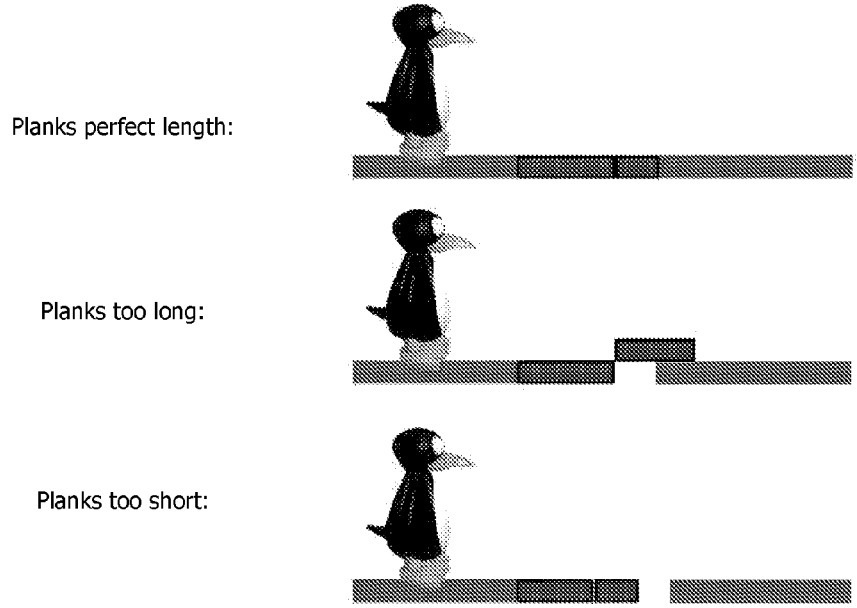

Figure 2: Planks perfect, too long, too short

Answer Choices: In one embodiment, four answer choices, clicking on an answer choice makes the selected planks move towards the hole. The Answer Choice planks can be arranged either horizontally or vertically. When vertical, after selecting the answer choice the planks rotate 90 degrees.

Planks: In one embodiment, the planks are blue with a black outline. The planks join when they try to fill the hole. (the black outline lets you still see the individual planks). If the sum of the plank's lengths is more than the hole's width, then not all of the planks will fit into the hole.

Hole: When the hole is filled perfectly, JiJi can cross, otherwise, JiJi cannot cross.

TemporalEstimation Arena:

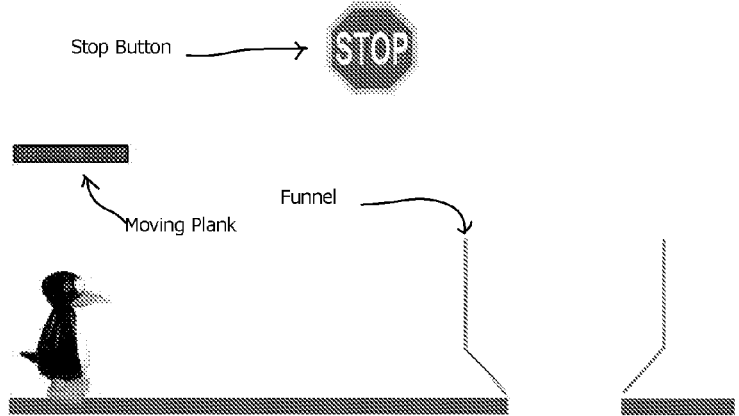

Figure 3: Example layout for TemporalEstimation Arena

In the TemporalEstimation version, a plank moves across the screen, and a stop button must be pressed at the right time. If the plank is within the funnel opening, then the Moving Plank will fall into the hole. If the plank overlaps the funnel edges at all, then the plank will fall onto the funnel and stop. If the moving plank stops outside of the funnel, then it falls to the ground and blocks JiJi's path. If the moving plank reaches the edge of the arena, then the stop button automatically activates and the plank falls.

Another aspect of the TemporalEstimation Arena is a Cover that hides where the funnel is located and blocks the visibility of the Moving Plank, as shown in Figure 4.

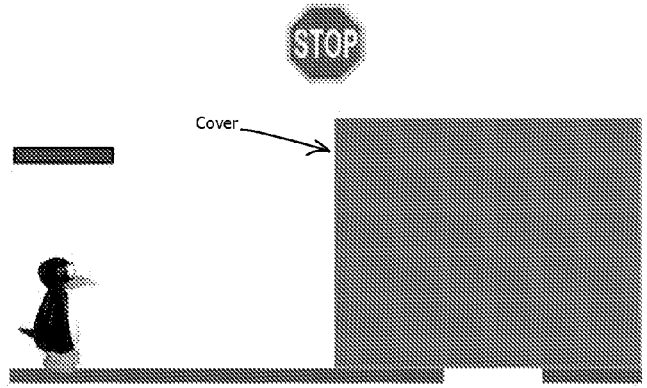

Figure 4: TemporalEstimation Arena with Cover

Interactivity:

Clicking on an Answer Choice: The planks in the choice attempt to fill the hole

Clicking on the Stop Button: The cover (if any) becomes transparent and moves out of the way. The plank immediately stops and falls directly downward. If the plank falls within the funnel opening, then it will fall into the hole. Otherwise, the plank will either hit the edge of the funnel or be completely outside the funnel.

Puzzle Definition: There is an example puzzle definition XMLNode for EstimationBridge:

SpatialEstimation Arena:

<def estimation='spatial' holeLoc='120' verticalPlanks='0' choice0='60, 50, 60' choice1='60, 70, 60' choice2='20, 50, 50, 10' choice3='30, 10' correct='1'/> estimation: This specifies the type of layout. This is a SpatialEstimation layout.

holeLoc: This is the hole location. This number is in pixels from the left of the screen. It needs to start about 100 pixels over so that JiJi has a place to stand.

verticalPlanks: This is a Boolean (0 or 1) that determines the planks in the answer choices are vertical. The example shown in Figure 1 has horizontal planks. Figure 5 shows an answer choice with vertical planks:

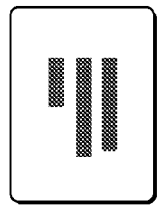

Figure 5: Answer Choice with verticalPlanks='1' choice0-choice3: These attributes are lists of numbers corresponding to the lengths of planks in each Answer Choice. The number of items specifies how many planks are in each Answer Choice, and the values are the lengths in pixels. Each Answer Choice can have a different number of planks, but must have at least one plank.

correct: The index (starting at 0) of the correct answerChoice. This specifies the hole length in pixels (the sum of the values in the corresponding choice).

TemporalEstimation Arena:

<def estimation='temporal' holeLoc='520' holeLength='80' plankSpeed='10' plankDelay='1'
    funnelExtent='30,40' coverVisible='1' coverLength='300' /> estimation: This specifies the type of layout. This is a TemporalEstimation layout.

holeLoc: The hole location, in pixels from the left of the screen. It needs to start about 100 pixels over so that JiJi has a place to stand.

holeLength: The hole length in pixels.

plankSpeed: The speed at which the plank moves in pixels per second. The plank should move as smoothly as possible and maintain a steady rate.

plankDelay: How many seconds to wait before the plank starts moving. The plank starts moving from off the left edge of the screen (completely off the left edge), and is only visible once it starts moving.

funnelExtent: The distance in pixels that the left and right edges of the funnels extend away from the left and right edges of the hole. The left and right edge of the funnel can extend away from the hole by different amounts.

coverVisible: A Boolean indicating if the cover will be visible. If this is "1", then the cover will show up as soon as the plank starts moving. In one embodiment, the cover is always invisible during the plankDelay period.

coverLength: The cover length in pixels measured from the arena right edge (right justified).

Parameters and Settings:

ClickStream:
  The following user events should be registered by calling recordClick() on the GameLogic subclass:

Pond Location: recordClick( "mClick", "pondLocation#")

Lives and Scoring: Lives and scoring is handled by the GameViewer for this game.

Components: No special components (besides the GameLogic subclass) are needed.

External Assets:

Demo and graphics:

Animated Demos: Several animated demos are included.

Graphics: All the graphics needed are included in the animated demo fla files.

APPENDIX F

Example 1-6

Title: Ice Blocks

Overview: IceBlocks requires the student to determine the volume of 3D blocks. This game practices multiplication skills and also shows an example of why multiplication is necessary as opposed to simply counting. Here the 3D nature of the problem hides many blocks, so simple counting is not possible. One must use multiplication skills to find the volume.

Objective: Determine which group of blocks has the same volume as the hole in the walkway.

Arena Layout:

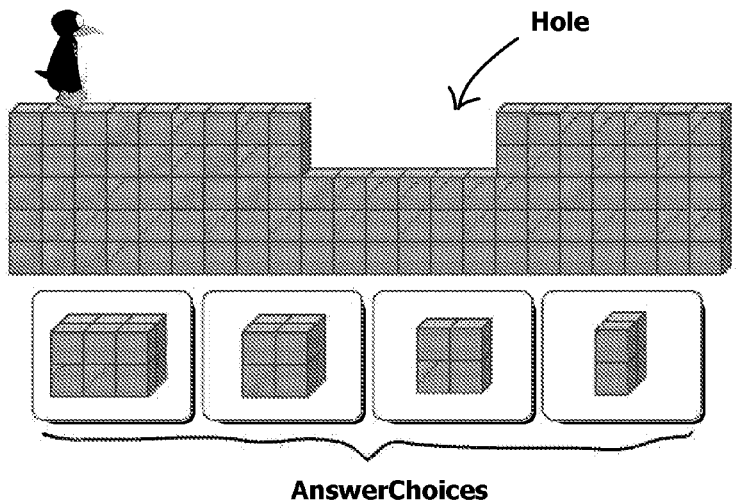

Figure 1: Example layout

The IceBlocks arena consists of a walkway with a hole in it. At the bottom of the screen are four answer choices of different sized blocks of cubes. The goal is to select the answerChoice with the same total number of blocks (i.e., the same volume) as the hole.

Walkway: The walkway is a 3D "wall" of cubes. It has a height of 5 cubes, and a length of 22 cubes. The walkway can be 1 or more cube deep. The example shown in Figure 1 has a walkway that is only 1 cube deep, but deeper walkways can be specified. (Note: For optimization purposes, blocks that can't be seen in the walkway don't have to actually be created, this will save on memory. Also, the first few blocks are where JiJi stands, and there won't be a hole there, so the very left section can be a single movieClip instead of individual cube movieClips...).

The Hole: The hole is a rectangular 3D section of the walkway where cubes have been removed. The dimensions of the hole are named X,Y and Z as shown in Figure 2.

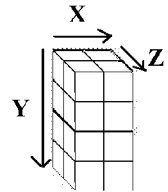

Figure 2: Labeling of the dimensions

AnswerChoices: At the bottom of the Arena are four answer choices containing different volumes of cube groups. When a user selects an answer choice, the selected cube group rearranges itself to try and fill the hole. If there are not enough cubes to fill the hole, then some amount of the hole will remain, and JiJi won't be able to pass. If there are too many cubes, then the cubes will pile up above the walkway and form a wall that prevents JiJi from passing. If the correct number of cubes is selected, then the hole will be perfectly filled, and JiJi will be able to walk off the right side of the screen.

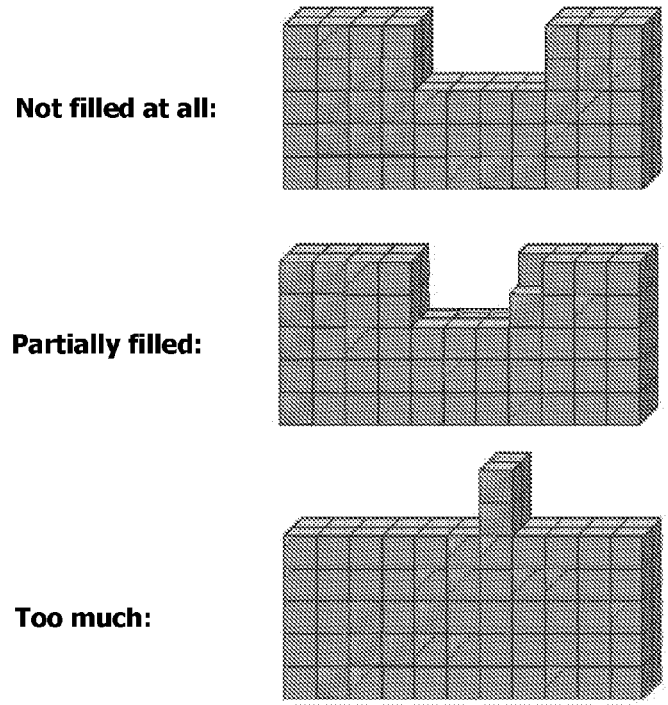

Figure 3: Different fill states of the hole

Interactivity:

Clicking on an AnswerChoice: The only user interaction is to click on one of the four answerchoice buttons. After it is clicked, the other buttons go away, and the cubes in the answerChoice rearrange themselves to fit (as best they can) into the hole.

Puzzle Definition:
This is an example puzzle definition XMLNode for IceBlocks:

<def hole='6,2,1' choices='3,2,2,2,2,2,2,2,1,1,2,2' language='0,0' showOneZ='0'/>

A description of each attribute:

hole: This specifies the X,Y,Z dimensions of the hole. The hole shown in Figure 1 has X=6, Y=2 and Z=1, so the hole attribute is "6,2,1". The third value of this attribute (the Z value) determines how deep the walkway is. If the Z value is 2, then the walkway is 2 cubes deep. In Figure 1, the walkway is only 1 cube deep. The examples shown in Figure 2 have walkways that are 2 cubes deep.

choices: This specifies the X,Y,Z dimensions of each of the 4 answerChoices. This attribute should have a total of 12 integers. The first 3 are the XYZ values for the first choice, the next 3 are for the second choices, and so on...

language: This is a list of 2 Booleans that specifies which parts of the arena are to be represented by language. The first value corresponds to the hole. The second refers to the groups of cubes in the answerChoices. Figure 4 shows how these elements are to be represented by language.

showOneZ: This is a single Boolean value which determines if Z dimensions of 1 are to be shown or not. This attribute only has meaning if the language attribute is 1. This attribute influences the language representations of both the hole and the answer choices. When showOneZ is 0, then a Z value of 1 will be omitted. In other words, if the hole is 2x2x1, then only "2x2" will be shown. The top example in Figure 4 has the showOneZ set to 0. If showOneZ is 1, then it will show "2x4x1". In other words when showOneZ is 0, it will show the Z value only when it is not 1. When showOneZ is 1, it always shows the Z value.

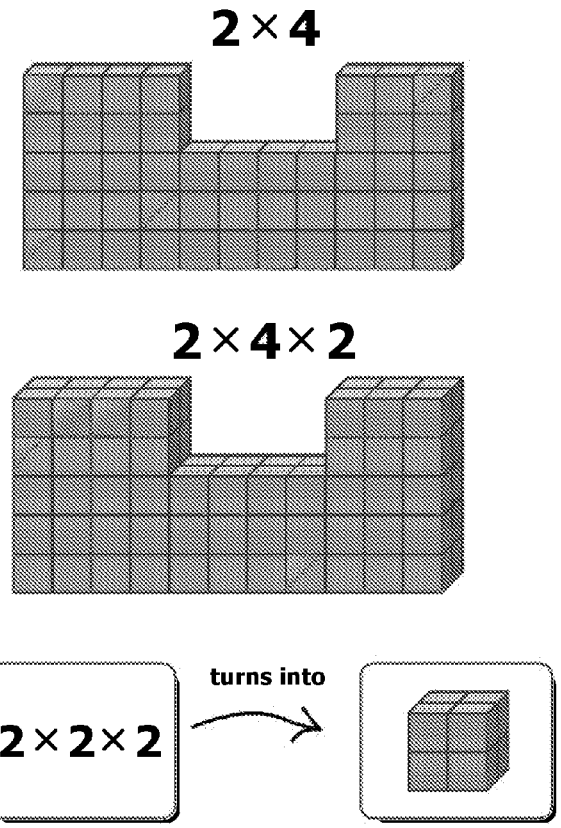

Figure 4: Language Representations

Parameters and Settings:

ClickStream: The following user events should be registered by calling recordClick() on the GameLogic subclass:

Drag an answerChoice:

recordClick( "mClick", "Choice#")

Lives and Scoring: Lives and scoring is handled by the GameViewer for this game.

Components: No special components (besides the GameLogic subclass) are required.

External Assets:
   None, sounds are stored in the Flash file.

Animated Demos: Several animated demos are included.

Graphics: All the graphics needed are included in the animated demo fla files.

APPENDIX G

Example 1-7

Title: PieMonster

Overview: PieMonster teaches how to add fractions. It also teaches whole and mixed fractions. Fractions are presented as portions, pieces, of a pie.

Objective: Determine how many pieces of pie (and what sizes) fill the pie Monster's hungry belly to satisfy him and help JiJi burn down the blockade blocking JiJi's passage.

Arena Layout: The arena has two modes. The first is MultipleChoice mode, the second is PieCutting mode. In MultipleChoice mode, four choices are presented; the student selects a choice by clicking a button. In PieCutting mode, the student performs more sophisticated interactions including cutting pies (with pie cutters) and dragging pieces onto a conveyor belt and then clicking on JiJi. The two modes are otherwise very similar.

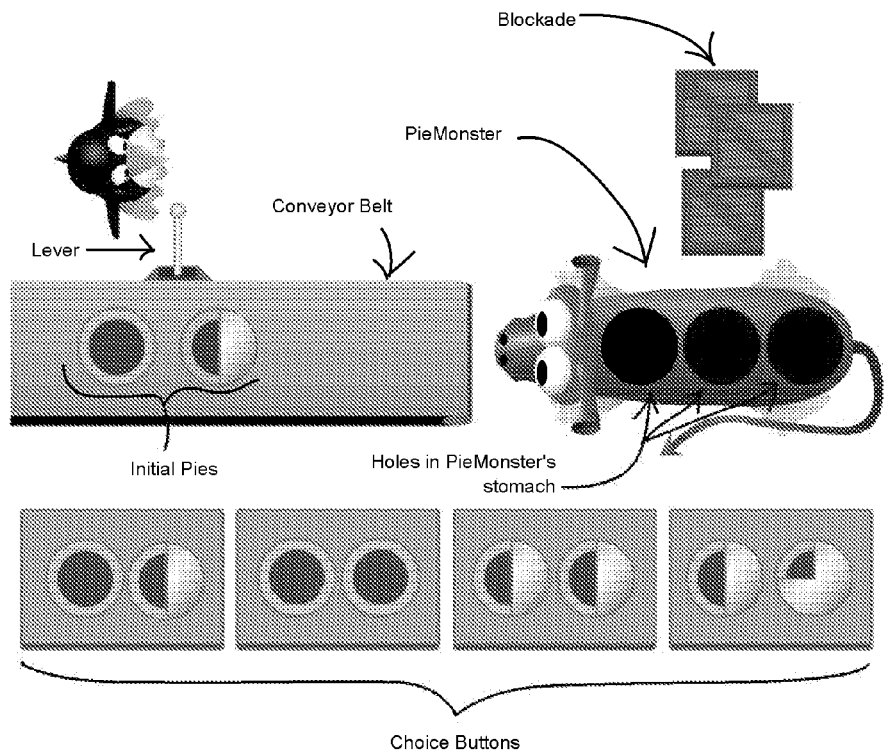

Figure 1: Example layout (MultipleChoice Mode)

MultipleChoice Mode: In this mode, the arena is arranged as shown in Figure 1. In this example, the pie monster has three pies worth of empty space in its stomach. The Conveyor belt starts off with 1.5 pies, thus the user must select the button with 1.5 pies in order to fill the PieMonster.

The arena may also have a language representation of each of the pieces (both modes). This is discussed in detail in the Puzzle Definition section.

ConveyorBelt: At the top-left of the arena is a conveyor belt. It can hold up to five pie tins. In one embodiment, the conveyor belt has a lever that is pushed by JiJi to start the pies moving into the Pie Monster's mouth. The conveyor belt starts out with some "Initial Pies" which are added to by the user. As this game does not have the notion of negative pies, the Initial Pies must always be the same or less than what is needed. The Initial Pies are blue in color whereas the pies added by the user are dark red. The color distinction informs the student which parts were there to begin with.

Pies: The pies consist of a Pie Tin, and zero or more Pie Slices. In this game, the smallest slice is $1/8^{th}$ of a pie, and everything is a multiple of 1/8. Pie slices fill in the Tin from the top in a counter-clockwise manner as shown in Figure 2.

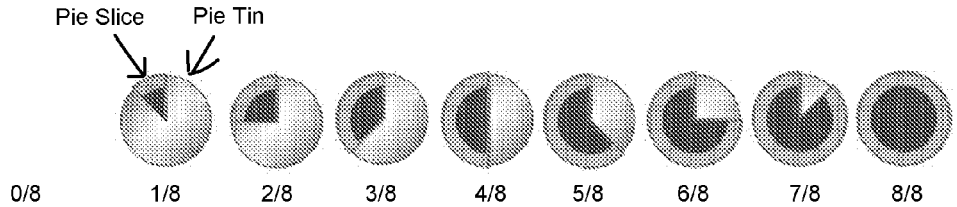

Figure 2: Pie filling method

In Figure 2, the "zero pie" shows no pie tin. A pie tin only appears when >0 amount of pie is in place.

PieMonster: In one embodiment, the PieMonster has up to 3 pies of empty space in his stomach. Like the pies, the spaces in Pie Monster's stomach are built up from units of 1/8 of a pie. When PieMonster eats the pies, they fill up the spaces in this stomach from left to right and with the same filling method as shown in Figure 2. Each space is completely filled before the next space begins to be filled. Empty spaces in PieMonster's stomach turn green as shown in Figure 3.

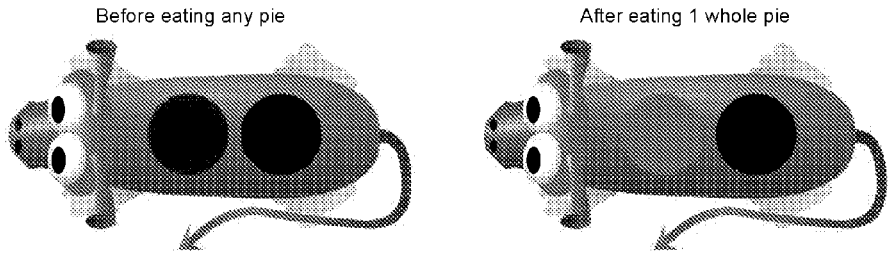

Figure 3: PieMonster filling method

When PieMonster isn't fed enough pie, he takes a bite out of the conveyor belt. When he is fed too much pie, it spits the extra pie out and gets sick. When he is fed the perfect amount, PieMonster turns and breaths down the blockade with fire. This is illustrated in Figure 4.

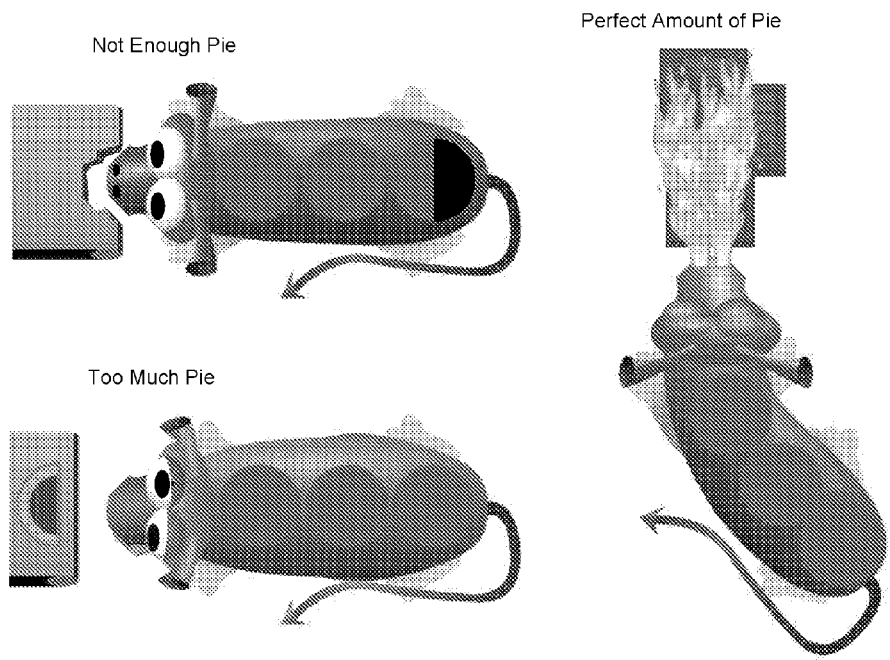

Figure 4: Different results after feeding PieMonster

Choice Buttons: In the MultipleChoice mode, there are 3 buttons to choose from along the bottom of the arena. When a choice is selected, the pies from the choice move onto the conveyor belt, and JiJi immediately pushes on the lever to start the conveyor belt. The pies move to the right and PieMonster eats the pies one by one.

PieCutting Mode: In this mode, the arena is laid out as shown in Figure 5. The main difference between this mode and the MultipleChoice mode is that the buttons are replaced by a long table of pies, and pie cutters are supplied to cut the pies into pieces. In the PieCutting mode, the individual pieces must be dragged from the table onto the conveyor belt. The initial pie pieces that start off on the conveyor belt (the blue pieces of pie) may not removed, however, the pieces that the user places may be taken off and placed back on the table.

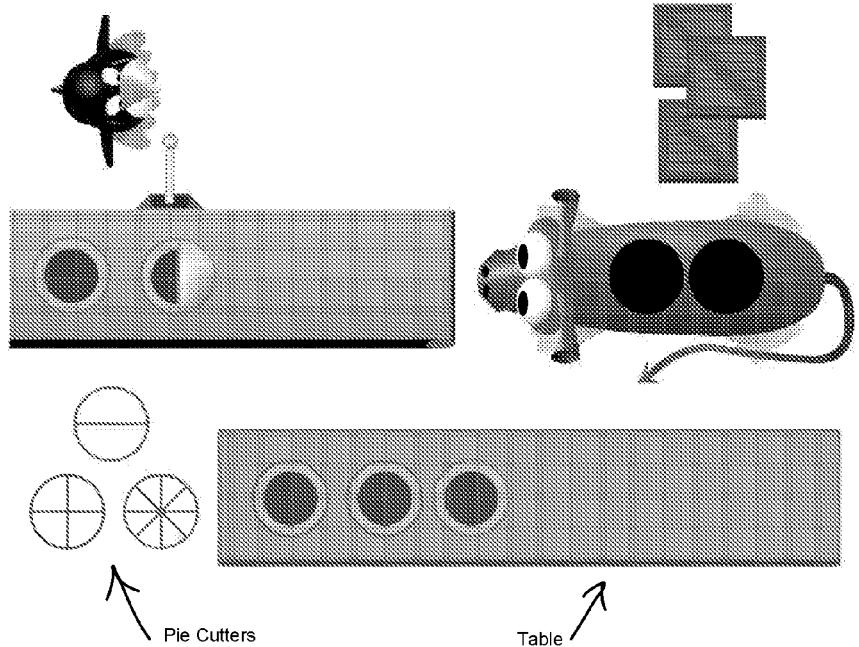

Figure 5: Arena layout in PieCutting Mode

PieCutters: Three pie cutters are available on the arena (1/2, 1/4 and 1/8 slices). The student drags a pie cutter and drops it onto a whole pie sitting on the table. Once the PieCutter is released, it cuts the pie underneath it and then pops back to its original position. More than one pie cutter may be dropped onto a table pie. For instance a 1/2 cutter can be dropped and then a 1/4 cutter can be dropped afterwards on the same pie. When this happens, the remaining pieces on the pie are cut as would be expected. The seven types of pie cutters are shown in Figure 6 (4 types of 1/2 cutters, 2 types of 1/4 cutters and one type of 1/8 cutter).

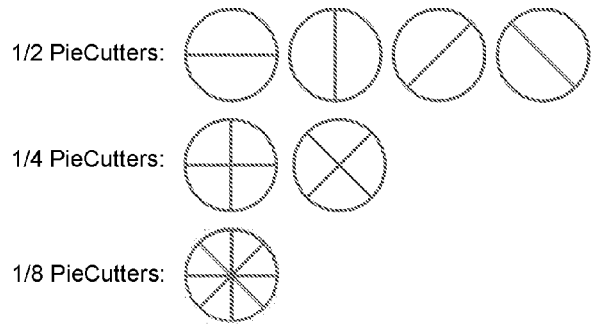

Figure 6: Different types of PieCutters

Interactivity:

Dragging A Pie Slice from the Table to the Conveyor Belt: When the cut slices of pie are dragged from the table to the conveyor belt, the piece gets positioned into the tin it is dropped onto, if possible. If the piece is dropped onto an empty spot on the conveyor belt, then a new tin is created to hold the new piece. The conveyor belt can hold up to 5 pie tins.

Clicking on JiJi: In the Pie Cutting mode, clicking on JiJi starts the Conveyor Belt.

Puzzle Definition: There is an example puzzle definition XMLNode for PieMonster:

MultipleChoice Mode:

<def mode='multipleChoice' start='8,4' choice0='8,4' choice1='8,8' choice2='4,4' choice3='4,2' language='0,0,0'/>

Description of each attribute:

mode: This defines the mode. Here it's multipleChoice mode.

start: This defines how much pie is initially on the conveyor belt ("initial pies"). This is a list of how many 1/8 pieces are in each pie tin. In the above example (8,4), it starts out with a whole pie (8/8) and half a pie (4/8), as is shown in Figure 1. This attribute can be a list up to 5 numbers (5 pie tins).

choice0 – choice3: These define how many pies are in each answer choice. This lists 1 or 2 numbers indicating how many 1/8 pieces are in each tin (maximum of 2 tins per choice).

language: This lists three Boolean values indicating if the parts of the arena should be represented by language or not. The first value is for the initial pies on the conveyor belt. The second value is for the holes in the Pie Monster's stomach. The third value is for the answer choices. The following shows how these should be represented:

1) Language representation of the Initial Pies on the Conveyor Belt:

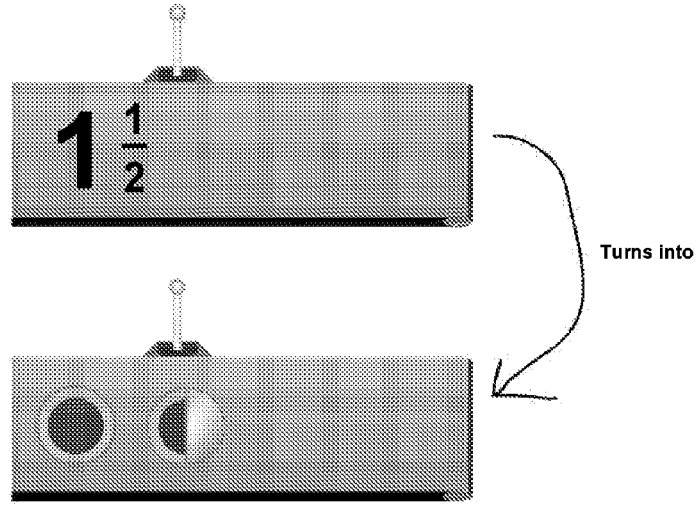

Figure 7: Language representation of Initial Pies.

Here the amount of pie on the conveyor belt is represented by a mixed fraction (whole number followed by a fraction). Once the student chooses an answer, the number turns into the pie representation (as shown at the bottom of Figure 7).

2) Language representation the Pie Monster's stomach:

The empty space in the Pie Monster's stomach is represented by a black box with the amount of space shown as a mixed fraction (white text on black background of the box) as shown in Figure 8. Once the user makes a selection from the answer choices, the number transforms into the normal pie-shaped holes, as shown at the bottom of Figure 8.

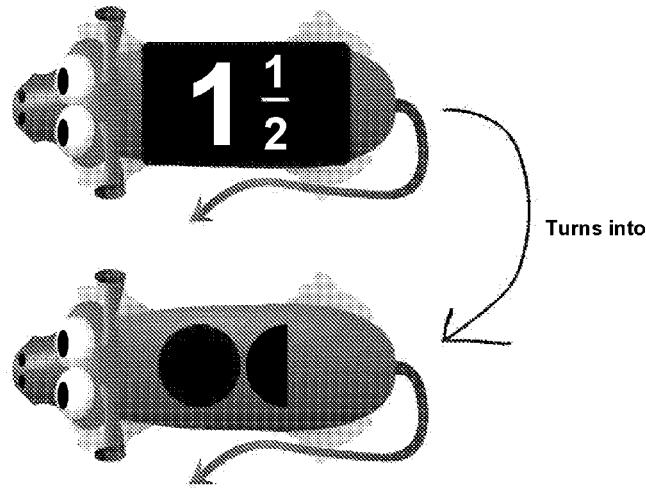

Figure 8: Language representation of PieMonster.

3) Language representation of the answer choices:

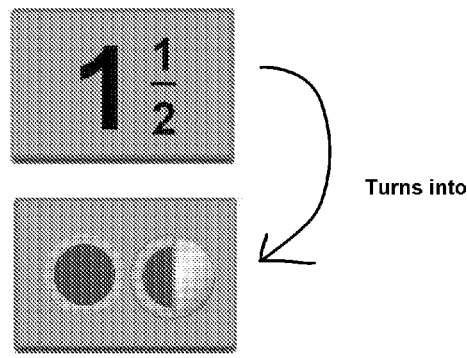

Figure 9: Language representation of the answer choices.

Like the conveyor belt, each answer's amount of pie is represented numerically by a mixed fraction which turns into actual pieces of pie after the user selects their choice.

PieCutting Mode:

<def mode='pieCutting' start='8,4' onTable='8,8,8' cutters='halfH,quarterH,eighth' />

Description of each attribute:

mode: This defines the mode. Here it's pieCutting mode.

start: This attribute works the same as in the MultipleChoice mode.

onTable: The pies that begin on the table. As with the other attributes, an 8 means a whole pie. The table holds up to 6 pie tins.

cutters: A list of the cutters provided. Up to 4 cutters can be specified. The names of the cutters are as indicated in Figure 10.

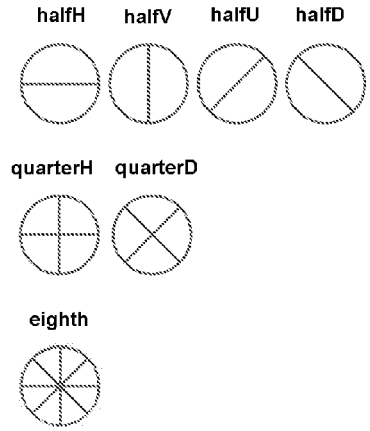

Figure 10: Names of the different types of PieCutters.

Parameters and Settings:

The arena parameters that should be settable after the arena is compiled (turned into a .swf file):

beltSpeed: This is the speed that the conveyor belt moves the pies.

ClickStream:
The following user events should be registered by calling recordClick() on the GameLogic subclass:

Answer Choice (in MultipleChoice mode):

recordClick( "mClick", "choice#")

Pie Cut (in PieCutting mode):

recordClick( "mDrag", "pieCutterName,PieIndex#")

Pie slice drag from Table (in PieCutting mode):

recordClick( "mDrag", "fromTable:AmountOfPie")

Pie slice drag to Table from conveyor belt (in PieCutting mode):

recordClick( "mDrag", "toTable:AmountOfPie")

Click on JiJi (in PieCutting mode):

recordClick( "mClick", "JiJi")

Lives and Scoring: Lives and scoring is handled by the GameViewer for this game.

Components:
No special components (besides the GameLogic subclass) are needed. If feasible, the unfolding controllers can be made into reusable components.

Special Considerations:

Demo and graphics:

Animated Demos: Several animated demos are included.

Graphics: All the graphics needed are included in the animated demo fla files.

APPENDIX H

Comparative Example 1

Various iterations of the game seed, previously known as "Big seed" have been reviewed in the prior art. The following example comparing the versions of seed, to more clearly identify the points of novelty presented in the system.

The prior art version of seed, 'Big Seed' was discussed in detail in the following article, entitled "Innate spatial-temporal reasoning and the identification of genius ", by Peterson et al, appearing in 'Neurological Research' 2004, Jan, Volume 26 pages 2- 8, and is incorporated herein by reference, as if fully set forth. A description of a new embodiment of big seed, re-titled 'Seed' is as follows:

Title: Seed

Overview: Seed is a spatiotemporal puzzle game that requires the student to think ahead and see patterns of symmetry unfold.

Objective: Fill all the holes with colored tiles. The student duplicates color tiles by unfolding. Colors can also be transformed.

Arena Layout: A stage in the center (called seedStage) contains the holes and tiles. Below are unfolding controls that can unfold the different colors, and color-changing controls.

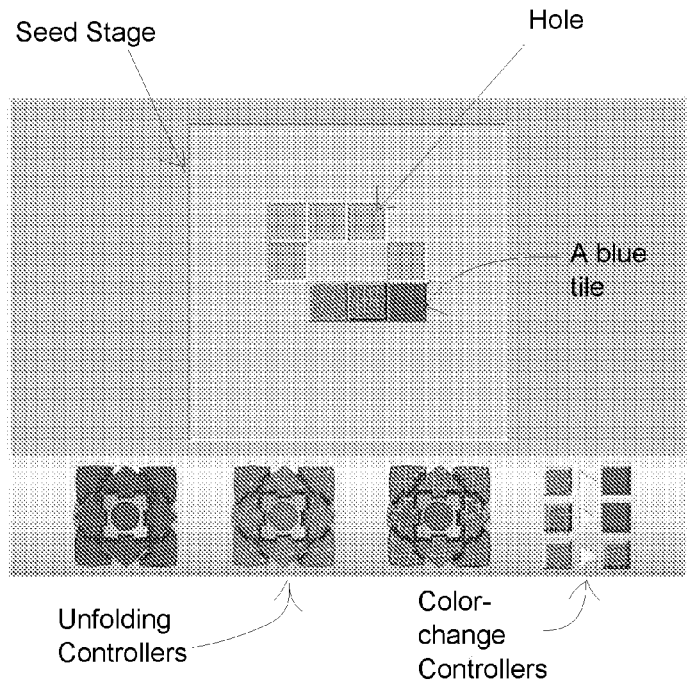

Figure 1: Example layout

The Tiles: As shown above (Figure 1), the tiles have both different colors, and different textures. This aids those with visual impairments.. A fourth tile type appears when a tile ends up in a wrong location. This fourth type is red in color with an "X" in the middle.

The Stage: The stage has 8x8 tile locations arranged in an 8x8 array. The locations are numbers 0 starting from the top-left rightward and then downward as follows, through 63:

| 0  | 1  | 2  | 3  | 4  | 5  | 6  | 7  |
|----|----|----|----|----|----|----|----|
| 8  | 9  | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

Figure 2: Numbering of tiles

Tiles can appear outside of the stage only when a user gets a problem wrong. Then the titles that end up outside the stage are red and serve as lack of success indicators.

The Unfolding Controllers: Each tile type has its own unfolding controller. Each controller unfolds same colored tiles in 8 different directions. The controllers also have an optional center button. If the center button is pressed, then two directions can be unfolded at the same time (as explained more under the Interactivity section).

The directions have the following numbers, in the following manner:

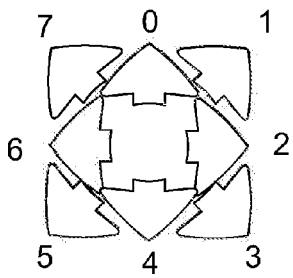

Figure 3: Numbering of directions

Interactivity:

Tile Unfolding: Tiles of a single type unfold together as a single unit. The unfolding process should be animated in a demo swf file.

Center Button: The same type tiles unfold together as a single unit. The unfolding process should be animated.

Puzzle Definition:
There is an example puzzle definition XMLNode for Seed:

<def holes='18,19,20,26,29' blues='37' purples='36' greens='35' allowCenterClicks='1'/>

Description of each of attribute:

holes: List of tile locations that should start out as holes.

blues: List of tile locations that start out blue.

greens: List of tile locations that start out green.

purples: List of tile locations that start out purple.

allowCenterClicks: This attribute specifies whether to allow the center button to be clicked or not. When this attribute is '1', the center buttons should be visible, and clicks are allowed. When '0', the center buttons are not visible, and clicks are not allowed.

Parameters and Settings:

The following are arena parameters that should be settable after the arena is compiled (turned into a .swf file):

flipSpeed: This is the speed that the tiles unfold.

ClickStream: The following user events should be registered by calling recordClick() on the GameLogic subclass:

Unfold Controller:
recordClick( "mClick", "direction#"); or: recordClick( "mClick", "centerButton");

Shape:
recordClick( "mClick", "shape#" + shapeIndex);

Lives and Scoring: Lives and scoring is handled by the GameViewer for this game.

Components: No special components (besides the GameLogic subclass) are needed. The unfolding controllers can be made into reusable components.

External Assets: Dynamically load the game sound effects from the Assets/sound folder.

Concepts:

Special Considerations:

Demo and graphics:

Animated Demos: Several animated demos are included.

Graphics: All the graphics needed are included in the animated demo fla files.

Sound effects: The sounds should be kept external to the arena.swf file and should be dynamically loaded from the Assets/sounds folder.

APPENDIX I

Comparative Example 2

Title: Bricks

Bricks

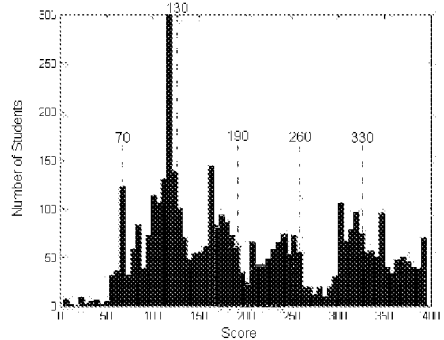

Distribution of the all the playing scores of the students on the first day.

Figure 3

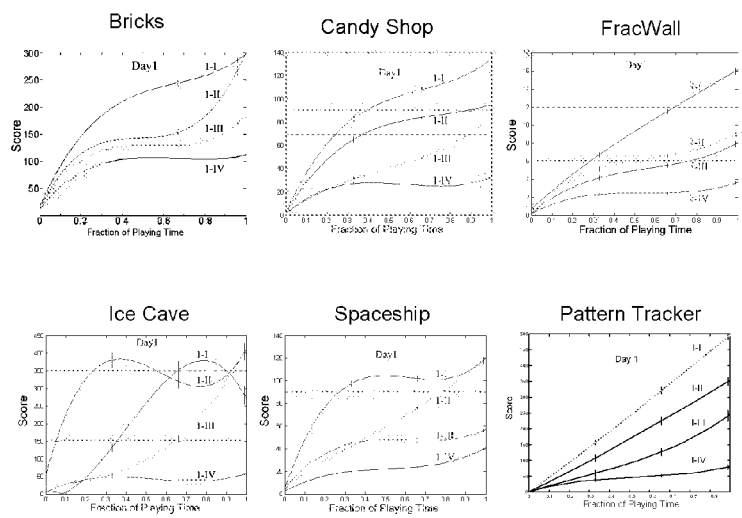

Figure 4

The left side of Figure 1 shows a screen shot of a prior ST game, bricks, with game play features intended to maintain attention (i.e., objects walls flash and moving the penguin character past them gives points, floors move, etc.). The right side of Figure 1 shows a minimized version of bricks with attention/game play factors removed. Game involves only selecting the appropriate shape. No movement of the character or other game play features occurs.

Figure 2 shows an analysis of the learning curves consisting of the scores obtained on consecutive plays of the bricks game. Data was obtained from >2000 students. Analysis determined that students fell into 4 distinct groups of learning types. Upper left hand curve corresponds to learning curves for a prior bricks game. Groups I and II pass the game, Groups III and IV do not. Groups II-IV encounter barriers to learning indicated by a plateau in the score. Group II eventually overcomes this barrier to learning and goes on to pass, Groups III and IV do not. Numbers to the right of the graph indicate the percentage of students in each group. Lower right hand graph shows the learning curve analysis for the prior version of bricks with the distracting game play factors removed. Note that no plateau occurs for any group and the significant increase in the number of students who pass the game as indicated by the percentages to the left of the graph.

Figure 3 shows a distribution of scores. Peaks indicate positions in the game that present learning barriers and correspond to the plateaus in the learning curve. These plateaus correspond to the occurrence of specific game play features in the prior bricks game.

Figure 4 shows a learning curve analysis for other non-impoverished video environment ST games.

What is claimed is:

1. A method of academic subject training in conjunction with a computer animation executed by a computing environment including a processor and a display, the method comprising:
   for each of a plurality of category areas related to the academic subject, creating a logical construct including establishing a set of consistent rules, so that each of the related academic subject area categories has a corresponding and appropriate set of consistent rules;
   displaying, via the processor and the display, and in a graphical user interface, a virtual apparatus with virtual components that are manipulated by a user being trained;
   teaching the user to understand logically consistent goals by operating the virtual apparatus in an impoverished video environment and without language interaction, and providing at least one of the virtual components of the virtual apparatus which can be manipulated;
   modeling, via the processor, properties and the set of consistent rules for a particular one of the academic subject area categories to the user by the virtual apparatus without language interaction;
   teaching the user to operate the virtual apparatus without language interaction;
   allowing the user to operate the virtual apparatus, including manipulating the virtual components, and/or selecting answer choices defined by the virtual apparatus to reach goals in a sequence of problems having progressive difficulty and without language interaction;
   receiving, via the graphical user interface of the computer environment, a user input manipulating a virtual component of the virtual apparatus;
   determining, based at least in part on the input, and in response to the input, a transformation of the virtual components of the virtual apparatus; and
   automatically animating movement, on the display and in the graphical user interface, of at least some of the virtual components of the virtual apparatus according to the determined transformation and so as to indicate to a user positive or negative feedback,
   wherein teaching the user to understand logically consistent goals comprises animating the result of manipulating the at least one of the virtual components to show how a path is changed from impassable to passable, wherein in the impoverished video environment only essential images are included in the animation, wherein essential images include only those images directly involved in a problem and its solution, and wherein there is no output on the display not involved in a problem's solution, and wherein without language interaction relies on spatial-temporal reasoning interaction, and
   wherein the academic training is without intervention and instruction by a teacher, wherein the display of the virtual components includes at least one predetermined virtual component that is configured as being transformable between a displayable graphical representation and a corresponding, displayable language/symbol representation, and wherein upon meeting a criterion related to the particular one of the academic subject area categories, the at least one transformable virtual component is indicated to be transformed from the displayable graphical representation to the displayable language/symbol representation, wherein the criterion related to the particular one of the academic subject area categories includes mastery of the academic subject area category by the user while using the displayable graphical representation for the transformable virtual component(s) of the academic subject area category.

2. The method of claim 1, additionally comprising:
   selecting an academic subject area category appropriate for the user; and
   selecting a sequence of problems according to the selected academic subject area category.

3. The method of claim 1, additionally comprising establishing error tolerances for the problems.

4. The method of claim 1, additionally comprising determining if the user has mastered an academic subject matter sub-category.

5. The method of claim 4, additionally comprising introducing language elements to the user in conjunction with the computer animation if the user has mastered the academic subject matter sub-category.

6. The method of claim 5, wherein the language elements comprise numerals and/or labels.

7. The method of claim 1, wherein the virtual components correspond to a graphical set of possible solutions to the problems.

8. The method of claim 1, wherein teaching the user to understand logically consistent goals comprises:
   displaying an arena having an animated character, an obstacle and the virtual apparatus; and
   animating, by the processor, a result of manipulating at least one of the virtual components.

9. The method of claim 1, wherein the path includes an obstacle and the animating includes showing how an animated character traverses past the obstacle on the path.

10. The method of claim 1, wherein selection of a wrong virtual component by the user causes the virtual apparatus to start working and once show a failure to achieve a goal for a particular problem.

11. The method of claim 1, wherein the essential images are of a minimum complexity in that they contain little or no information that is not directly related to the problem.

12. The method of claim 1, wherein the at least one virtual component has a corresponding flag that is configured to be set upon meeting the criterion related to the particular one of the academic subject area categories, wherein the transformation of a particular type of virtual component is controllable by the corresponding flag in the sequence of problems at selectable levels of training in each academic subject area category, wherein the sequence of problems at the levels of training in each academic subject area category includes a plurality of different animations configured to be displayed on the display.

13. The method of claim 1, wherein when a transformable virtual component is displayed in the form of the displayable language/symbol representation on the display for one or more subsequent problems in the sequence of problems, the transformable virtual component is transformed back to the displayable graphical representation and is displayed in the form of the displayable graphical representation on the display during animations in the one or more subsequent problems.

14. The method of claim 1, wherein the answer choices are defined by the virtual apparatus as one or more clickable objects or regions related to the virtual components.

15. The method of claim 1, wherein the displayable language/symbol representation of the at least one predetermined virtual component represents part of a mathematical expression.

16. The method of claim 1, additionally comprising:
identifying one or more of the virtual components as being transformable between a displayable graphical representation and a corresponding displayable language/symbol representation separately for each academic subject area category; and
wherein upon meeting a criterion related to a particular one of the academic subject area categories, determining which of the identified transformable virtual components is to be transformed from the displayable graphical representation to the displayable language/symbol representation and to be displayed in the form of the displayable language/symbol representation, wherein the criterion related to the particular one of the academic subject area categories includes mastery of the academic subject area category while using the displayable graphical representation for the identified virtual components of the academic subject area category.

17. A method of academic subject training via a computer animation operating in a virtual computing environment, the method comprising:
performing a first computer animation indicative of a mathematically dependent task in an impoverished video environment, wherein the first computer animation is executed by a computing environment having a display;
performing a second computer animation displayed on the display, wherein the second computer animation comprises a display of a multiple step problem and the presentation of a virtual apparatus with virtual components to model properties for a particular academic subject area and to accomplish the mathematically dependent task;
receiving input, via the impoverished video environment, indicative of user manipulation of the virtual apparatus executing in the computing environment so as to solve the multiple step problem, wherein the first and second computer animations are performed without language interaction;
determining, based at least in part on the input, and in response to the input, a transformation of the virtual components of the virtual apparatus; and
automatically animating movement, on the display, of at least some of the virtual components of the virtual apparatus according to the determined transformation and so as to indicate to a user positive or negative feedback relevant to the academic subject matter and the user's manipulations if the multiple step problem was, or was not solved correctly,
wherein the academic training is without intervention and instruction by a teacher, wherein in the impoverished video environment only essential images are included in the animation, wherein essential images include only those images directly involved in a problem and its solution, and wherein there is no output on the display not involved in a problem's solution, and wherein the first and second displayed animations rely on spatial-temporal reasoning interaction of the user with at least one of the virtual components in the virtual apparatus,
wherein the display of the virtual components includes at least one virtual component that is configured as being transformable between a displayable graphical representation and a corresponding displayable language/symbol representation, and wherein upon meeting a criterion related to a category of the particular academic subject area, the transformable virtual component is indicated to be transformed from the displayable graphical representation to the displayable language/symbol representation, wherein the criterion related to the category of the particular academic subject area includes mastery of the academic subject area category by the user while using the displayable graphical representation for the transformable virtual component of the academic subject area category.

18. The method of claim 17, wherein animating positive feedback comprises showing the user why the multiple step problem was solved correctly.

19. The method of claim 18, wherein showing the user why the multiple step problem was solved correctly comprises animating application of a selected correct solution from a discrete set of solutions to a path in an arena.

20. The method of claim 17, additionally comprising introducing language elements to the user in conjunction with the computer animation.

21. The method of claim 20, wherein the language elements comprise numerals and/or labels.

22. The method of claim 20, wherein the language elements are added to the display near the virtual apparatus.

23. The method of claim 20, wherein the language elements are indicative of portions of the virtual apparatus and are added to the display in place of portions of the virtual apparatus.

24. The method of claim 20, additionally comprising solving a new problem in a language-analytic computing environment without the spatial-temporal interactions.

25. The method of claim 17, wherein animating negative feedback comprises showing the user why the problem was not solved correctly.

26. The method of claim 25, wherein showing the user why the multiple step problem was not solved correctly comprises animating application of a selected incorrect solution from a discrete set of solutions to a path in an arena and visually indicates that the virtual apparatus will function incorrectly to attempt solving the multiple step problem.

27. The method of claim 17, wherein the method of training is self-contained.

28. The method of claim 17, wherein solving the problem teaches the user to utilize spatial temporal reasoning.

29. The method of claim 17, additionally comprising designating a task to be performed in the computer animation.

30. The method of claim 17, wherein the computer animation includes only essential images.

31. The method of claim 30, wherein essential images are images that are only directly involved in the problem and its solution.

32. The method of claim 17, wherein the positive feedback computer animation includes only essential output.

33. The method of claim 32, wherein essential output is graphical output only directly involved in a solution of the problem.

34. The method of claim 17, wherein the negative feedback computer animation includes only essential output.

35. The method of claim 17, wherein animating positive feedback comprises having an animated character traverse a horizontal path in an arena, wherein the path is completed by solving the multiple step problem, and showing proper use of the virtually manipulated apparatus, wherein animating positive feedback is illustrative of logic required to accomplish the task and solve the multiple step problem.

36. The method of claim 17, wherein animating negative feedback comprises having an animated character partially traverse a path up to an obstacle in an arena, and showing improper use of the virtually manipulated apparatus.

37. The method of claim 17, wherein the virtual apparatus comprises virtual components corresponding to a graphical set of possible solutions, including a correct solution, to the multiple step problem, and the received input is indicative of manipulation of one of the set of possible solutions.

38. The method of claim 17, additionally comprising:
   determining when a user has mastered an academic concept being taught by the training; and
   adding language elements into the computer animation when mastery has been achieved.

39. The method of claim 17, wherein the at least one virtual component has a corresponding flag that is configured to be set upon meeting the criterion related to the particular academic subject area, wherein the transformation of a particular type of virtual component is controllable by the corresponding flag in a sequence of problems at selectable levels of training in each academic subject area, wherein the sequence of problems at levels of training in each academic subject area includes a plurality of different animations configured to be displayed on the display.

40. The method of claim 17, wherein when a transformable virtual component is displayed in the form of the displayable language/symbol representation on the display for one or more subsequent problems in a sequence of problems, the transformable virtual component is transformed back to the displayable graphical representation and is displayed in the form of the displayable graphical representation on the display during animations in the one or more subsequent problems.

41. A method of self-contained academic subject training executed by a computing environment including a processor and a display, without intervention and instruction by a teacher, and without language interaction, the method comprising:
   performing a first computer animation indicative of a mathematically dependent task in an impoverished video environment, wherein the first computer animation is executed by a processor in the computing environment;
   performing a second computer animation displayed on the display, wherein the second computer animation comprises a display of a multiple step problem and the presentation of a virtual apparatus to model properties of, and to accomplish, the mathematically dependent task;
   receiving a user input, via the impoverished video environment, indicative of a solution to the multiple step problem using a virtual apparatus with virtual components displayed in the first and second computer animations, wherein the virtual apparatus comprises a graphical entity presented on the display that responds to one or more manipulations by a user of one or more of the virtual components according to rules corresponding to the mathematically dependent task;
   determining, based at least in part on the input, and in response to the input, a transformation of the virtual components of the virtual apparatus; and
   automatically displaying, on the display, a third computer animation indicating movement of at least some of the virtual components according to the determined transformation so as to indicate feedback that shows the user why the problem was or was not solved correctly in conjunction with the sequence of user manipulations of the virtual components previously received without intervention and instruction by a teacher, and without language interaction,
   wherein in the impoverished video environment only essential images are included in the animation, wherein essential images include only those images directly involved in a problem and its solution, and wherein there is no output on the display not involved in a problem's solution, and wherein the first, second and third animations rely on display of spatial-temporal reasoning interactions in place of language interactions,
   wherein the display of the virtual components includes at least one virtual component that is configured as being transformable between a displayable graphical representation and a corresponding displayable language/symbol representation, and wherein upon meeting a criterion related to a category of a particular academic subject area, the transformable virtual component is indicated to be transformed from the displayable graphical representation to the displayable language/symbol representation, wherein the criterion related to the category of the particular academic subject area includes mastery of the academic subject area category by the user while using the displayable graphical representation for the transformable virtual component of the academic subject area category.

42. The method of claim 41, wherein selection of a wrong virtual component by the user causes the virtual apparatus to start working and show a failure to achieve a goal.

* * * * *